(12) United States Patent
Brogdon et al.

(10) Patent No.: US 6,209,510 B1
(45) Date of Patent: Apr. 3, 2001

(54) PISTON AND CONNECTING ROD ASSEMBLY

(75) Inventors: James William Brogdon, Northville; David Keith Gill, Novi, both of MI (US); John K. Chatten, Mobile, AL (US)

(73) Assignee: Teledyne Technologies Incorporated, Los Angeles, CA (US)

( * ) Notice: Subject to any disclaimer, the term of this patent is extended or adjusted under 35 U.S.C. 154(b) by 0 days.

(21) Appl. No.: 09/123,900

(22) Filed: Jul. 28, 1998

(51) Int. Cl.[7] ........................................ F16J 1/14
(52) U.S. Cl. ........................ 123/197.4; 123/197.2
(58) Field of Search ............... 123/197.2, 41.37, 123/193.6, 197.4

(56) References Cited

U.S. PATENT DOCUMENTS

| | | | |
|---|---|---|---|
| 2,472,288 | * 6/1949 | Endsley et al. | 123/41.37 |
| 3,027,207 | * 3/1962 | Meurer | 123/197.2 |
| 4,241,705 | 12/1980 | Karaba et al. | |
| 4,377,967 | 3/1983 | Pelizzoni . | |
| 4,662,319 | * 5/1987 | Ayoul | 123/41.35 |
| 4,848,291 | * 7/1989 | Kawamura et al. | 123/193.6 |
| 5,179,916 | * 1/1993 | Shconfeld | 123/193.6 |
| 5,245,913 | 9/1993 | Kato . | |
| 5,261,363 | 11/1993 | Kemnitz . | |
| 5,413,074 | * 5/1995 | Horiuchi | 123/197.2 |
| 5,442,993 | 8/1995 | Baliotti, II et al. . | |
| 5,655,496 | * 8/1997 | Pong | 123/197.2 |
| 5,660,150 | 8/1997 | Andersen et al. . | |
| 5,701,802 | 12/1997 | Junge . | |
| 5,701,803 | 12/1997 | Lutz . | |
| 5,713,262 | 2/1998 | Sugiyama et al. . | |
| 5,794,582 | * 8/1998 | Horiuchi | 123/197.2 |

OTHER PUBLICATIONS

H. Sammons and E. Chatterton, "Napier Nomad Aircraft Diesel Engine", *SAE Transactions*, vol. 63 (1955), pp. 107–131.
Drawings of piston design for Teledyne Continental Motors aircraft engine first sold in the United States more than one year ago.

* cited by examiner

*Primary Examiner*—Marguerite McMahon
*Assistant Examiner*—Jason Benton
(74) *Attorney, Agent, or Firm*—Kirkpatrick & Lockhart LLP

(57) ABSTRACT

A piston and connecting rod assembly includes a piston crown, a piston skirt, a connecting rod, and a bearing insert. The piston skirt is a component separate from the piston crown and is connected to the piston crown to provide a piston body. The bearing insert is a component separate from the piston crown and the piston skirt and is fixedly disposed within the piston body. A bearing surface of a connecting rod contacts the bearing insert to thereby movably associate the connecting rod and the piston body.

93 Claims, 18 Drawing Sheets

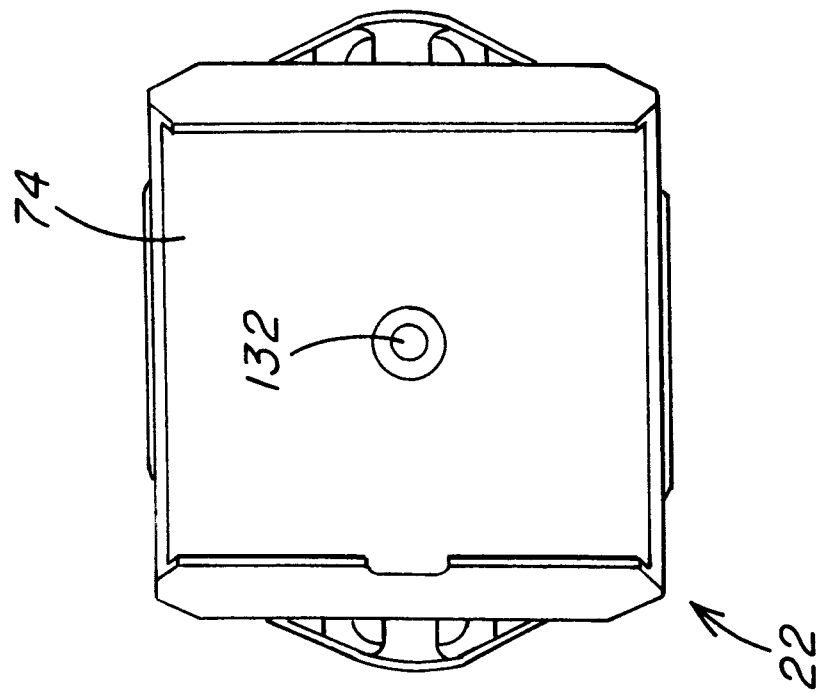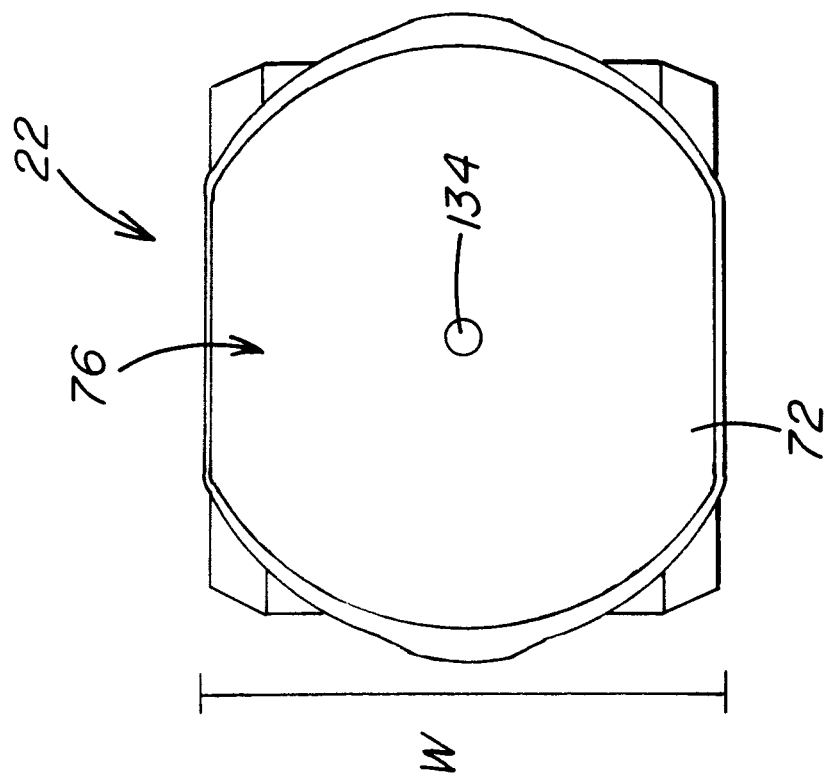

PISTON AND CONNECTING ROD ASSEMBLY

STATEMENT REGARDING FEDERALLY SPONSORED RESEARCH OR DEVELOPMENT

Certain of the research leading to the present invention was sponsored by the United States government under National Aeronautics and Space Administration (NASA) Cooperative Agreement No. NCC3-515. The United States government may have certain rights in this invention.

CROSS-REFERENCE TO RELATED APPLICATIONS

Not applicable.

TECHNICAL FIELD AND INDUSTRIAL APPLICABILITY OF THE INVENTION

The present invention relates to an assembly of a multi-part piston and a connecting rod adapted for use with the piston. More particularly, the invention relates to a multipart piston including a bearing component mounted within the piston body and a connecting rod configured to contact and movably associate with the bearing component. The piston and connecting rod assembly of the present invention may be used in, for example, an internal combustion engine such as a piston aircraft engine, and also may be applied in any other suitable application incorporating a reciprocating or otherwise movable piston element.

BACKGROUND OF THE INVENTION

Internal combustion engines have incorporated pistons of two general types: single-piece pistons and pistons having multiple parts. Known multiple-part pistons have included a piston head and a separate piston skirt that are connected together by a connecting element to form the piston portion of a piston and connecting rod assembly. The different parts of the piston may be constructed of differing materials and, for example, the piston head may be fabricated from materials that withstand the high temperatures and pressures encountered in the combustion region of the cylinder and in the vicinity of the piston rings, while the piston skirt may be constructed of lighter weight materials so as to reduce engine weight. In both one-piece and multiple-part pistons, a connecting rod is connected to the piston through a bearing member, commonly provided as an integral element of the piston head, so that the connecting rod may pivot relative to the piston as the piston reciprocates within the cylinder.

An example of the known piston constructions is provided in U.S. Pat. No. 4,377,967, which discloses a two-piece piston assembly having an upper part or piston head made of cast iron, malleable iron or similar material and a lower part or piston skirt made of an aluminum-containing metal. The piston head and piston skirt are secured in desired relative positions and are movably connected to a connecting rod by a piston pin. More specifically, the piston head includes downwardly extending pedestals having bosses at their lower portions defining holes for receiving the piston pin. Similarly, the piston skirt includes holes that register with the pedestal bosses and also receive the piston pin coaxially with the holes of the piston head to thereby connect the piston head, piston skirt, and the connecting rod.

U.S. Pat. No. 5,701,802 discloses a multiple-part piston having separate piston head and piston skirt components and wherein each of the piston head and piston skirt integrally incorporate a bearing block having a bearing surface. A coupling device is provided for interconnecting the piston head and the piston skirt and for interconnecting the individual integral bearing blocks of those two components. The two bearing blocks are configured so that when interconnected they form a bearing for rotatably coupling a connecting rod to the piston.

U.S. Pat. No. 5,713,262 provides a piston including a piston head having a pair of pin bosses extending downward from the piston head. Two identically configured piston skirts extend from the piston bead and are arranged symmetrically about the bosses. Side walls are provided around the bosses and connect the bosses to the piston skirts. A piston pin is provided in the two bosses and pivotally couples a connecting rod to the piston.

Manufacturing the piston head to include elements of the bearing for coupling the connecting rod to the piston body complicates the manufacturing process and increases the associated costs. Moreover, integrating bearing elements for the connecting rod into the piston head allows for the ready conduction of heat to the bearing elements from regions of the piston head that encounter the temperatures of combustion and that experience frictional heat generated by moving contact between the piston rings and the cylinder. The heat conduction increases the temperature experienced at the piston/connecting rod interface (bearing) and may adversely affect the wear properties at the bearing. The integration of connecting rod bearing elements into the piston head also may complicate the assembly of the piston to the connecting rod and, as seen in existing piston designs, may require that the piston skirt have a complicated, non-uniform construction and, for example, include voids therethrough so that the piston pin may be inserted into the piston body to interconnect the connecting rod and the piston body.

Thus, based upon at least the foregoing deficiencies in existing piston and connecting rod assembly designs, the need exists for an improved design for a piston and connecting rod assembly that reduces the complexity and costs associated with manufacturing the assembly, reduces piston/connecting rod bearing temperatures so as to enhance bearing life, and reduces the weight of the final assembly.

SUMMARY OF THE INVENTION

The present invention addresses the foregoing needs, among others, by providing an improved piston and connecting rod assembly including: a piston crown; a piston skirt that is a component separate from the piston crown; a connecting rod having first and second ends and including a first bearing surface on the first end; and a bearing insert that is a component separate from the piston crown, the piston skirt, and the connecting rod. The piston crown and piston skirt are connected together to provide a piston body, and the bearing insert is fixedly disposed within the piston body and is contacted by the connecting rod's first bearing surface, thereby providing an articulating joint, or in other words, a movable association, between the piston body and the connecting rod.

The piston crown and piston skirt may be threadedly connected together by, for example, providing the piston crown with a threaded annular inner surface region and the piston skirt with a corresponding annular outer surface region. However, any other suitable means of connecting the piston skirt and piston crown together also may be used.

The piston crown includes an inner surface and the bearing insert is disposed intermediate the inner surface of the piston crown and the first bearing surface. (As used herein, a first element is "intermediate" second and third elements even if one or more other elements are interposed between the first element and the second and/or third element.) The first bearing surface of the connecting rod may contact the bearing insert on a second bearing surface which is defined by a bearing portion of the bearing insert, and at least a region of the first bearing surface at least partially conforms to and articulates with at least a region of the second bearing surface. To provide for the conforming regions of the first and second bearing surfaces, one of the first and second bearing surfaces may be, for example, a concave surface and the other may be a convex surface, and at least a region of the concave surface conforms to and articulates with the convex surface. More particularly, such concave and convex bearing surfaces may be shaped as, for example, concave and convex surfaces defined by cylindrical or spherical radii of curvature or may be shaped as concave and convex regions of a barrel-shaped surface.

In one particular arrangement, the bearing portion of the bearing insert has a cylindrical perimeter, the bearing insert's second bearing surface is a concave surface defined by a spherical radius of curvature, and the first bearing surface of the connecting rod is a convex surface defined by a spherical radius of curvature that is generally identical to the spherical radius of curvature defining the insert's second bearing surface. At least a region of the concave spherical second bearing surface of the bearing insert contacts and articulates with at least a region of the convex spherical first bearing surface of the connecting rod.

The bearing insert of the piston and connecting rod assembly of the present invention also may include a mounting portion that may have first and second surfaces. The bearing portion of the bearing insert is disposed on or projects from the second surface of the mounting portion. The mounting portion is fixedly mounted within the piston body to fix the bearing insert's second bearing surface in the appropriate position within the piston body, and for that purpose the mounting portion of the bearing insert may include a circular perimeter region that is captured intermediate the piston crown and the piston skirt when those elements are connected together.

The piston and connecting rod assembly of the present invention also may include a separator, which is a separate component from both the piston crown and the piston skirt, and that is also fixedly disposed within the piston body. The separator may be disposed within the piston body so that it contacts the bearing insert, and the separator may be fixed in position within the piston body intermediate the inner surface of the piston crown and the bearing insert. The separator may be in the form of, for example, a circular plate, and the plate may be fabricated from a material having relatively low thermal conductivity (such as, for example, titanium, ceramic, or low thermal conductivity composite material), or at least lower thermal conductivity than the piston crown, in order to inhibit conduction of heat from the piston crown to the bearing insert and the connecting rod.

The piston and connecting rod assembly of the present invention may further include a retainer for movably securing the connecting rod to the piston body in an orientation in which the first bearing surface of the connecting rod contacts and may articulate with the second bearing surface of the bearing insert. The retainer may be either a component separate from each of the piston crown, bearing insert, and piston skirt, or may be an integral element of one of those structures.

When the retainer is provided as a separate component, it may be constructed so as to include, for example, two bearing elements, and each bearing element may include a pivot surface. Each bearing element may be, for example, an arched member having an inner surface including a concave inner surface region defining a pivot surface. In such a construction, the connecting rod may include two pivot elements, and each of the pivot elements of the connecting rod contacts and may movably associate with a pivot surface of a bearing element. When the pivot surface is a concave surface, each pivot element of the connecting rod may be an element, such as, for example, a cylindrical projection having a central axis generally transverse to a longitudinal axis of the connecting rod. Each cylindrical projection includes a convex surface that may contact and movably associate with a pivot surface.

The retainer also may include a mounting portion having first and second surfaces and that is fixedly secured within the piston body, and the bearing elements extend from the mounting portion's first surface. To fixedly secure the retainer within the piston body, the retainer's mounting portion may be shaped to include a circular perimeter region that is captured between the piston body and the bearing insert, with the retainer's bearing elements extending from its mounting portion and in the direction of the second end of the connecting rod, when the piston crown is connected to the piston skirt. The mounting portion of the retainer further may include a void therethrough, and the bearing portion of the bearing insert is disposed through the retainer's mounting portion void so that the first surface of the bearing insert's mounting portion contacts the second surface of the retainer's mounting portion.

The retainer also may be provided as an element of another component. For example, the retainer may be constructed so as to comprise two bearing elements projecting from the inner wall of the piston skirt within the piston body. Each bearing element may include a pivot surface that contacts and movably associates with the connecting rod. For example, each bearing element may be constructed to include a concave surface defining a pivot surface of the bearing element, and the connecting rod may include two pivot elements, each pivot element including a convex surface that contacts and movably associates with one of the concave pivot surfaces. Each pivot element of the connecting rod may be, for example, a cylindrical projection having a central axis that is generally transverse to a longitudinal axis of the connecting rod.

The piston and connecting rod assembly of the present invention may be constructed to include a pathway for circulation of fluid, such as engine oil, between the second end of the connecting rod and the inner surface of the piston crown. The pathway may provide, for example, a means for providing coolant and/or lubricant through the assembly and to the piston crown and, in particular, provides a means of lubricating the interface between the articulating regions of the second bearing surface of the bearing insert and the first bearing surface of the connecting rod. The pathway may include, for example, a first fluid passageway between the second end and the first bearing surface of the connecting rod, and may further include a second fluid passageway between the second bearing surface and the first surface of the bearing insert, so as to provide a fluid pathway from the second end of the connecting rod, to the area of contact between the connecting rod and the bearing insert, and then to the inner surface of the piston crown. If a separator is included in the piston and connecting rod assembly of the invention, the separator may include one or more ports allowing passage of fluid between the bearing insert and the piston crown's inner surface. The separator also may be configured to, for example, direct fluid so that it initially flows to a desired region of the inner surface of the piston crown, such as an area adjacent the piston ring grooves that may be present on the outer surface of the piston crown. Channels and/or other recesses on the inner surface of the piston crown may be provided to suitably circulate coolant fluid about the inner surface.

One or more of the individual elements of the piston and connecting rod assembly also may include passages allowing for the conduction of fluid away from the inner surface of said piston crown. Thus, the piston and connecting rod assembly of the invention may provide for channels and passages in the various components so as to establish a fluid circulation pathway for, for example, engine oil and/or other lubricant and/or coolant fluid, from the second end of the second end of the connecting rod, to the inner surface of the piston crown, and away from the inner surface of the piston crown.

The present invention also is directed to an apparatus including a piston and connecting rod assembly constructed according to the present invention. Such apparatus may include, for example, an internal combustion engine, compressor, or slider crank mechanism. However, it will be understood that the use of the piston and connecting rod assembly of the invention is not limited to those applications and may be adapted for use in other applications requiring a reciprocating or otherwise movable piston element.

The various components of the piston and connecting rod assembly of the present invention may be constructed without complicated machining or casting, so as to reduce the complexity and costs associated with manufacturing. In addition, the provision of the bearing insert as a separate component, as well as, for example, the possible inclusion of the separator, may reduce heat conduction from the piston crown to the interface between the piston and the connecting rod, reducing wear at the interface and prolonging the service life of the assembly.

The reader will appreciate the foregoing details and advantages of the present invention, as well as others, upon consideration of the following detailed description of embodiments of the invention. The reader also may comprehend such additional details and advantages of the present invention upon practicing the invention.

BRIEF DESCRIPTION OF THE DRAWINGS

The characteristics and advantages of the present invention may be better understood by reference to the accompanying drawings in which:

FIG. 20 is a plan view of a first bearing surface of the connecting rod depicted in FIGS. 18 and 19, and depicting the bearing surface contacting the piston/rod bearing insert;

FIG. 21 is a plan view of the second end of the connecting rod depicted in FIGS. 18 and 19, and depicting the slipper-type bearing;

DETAILED DESCRIPTION OF EMBODIMENTS OF THE INVENTION

Figure 1:
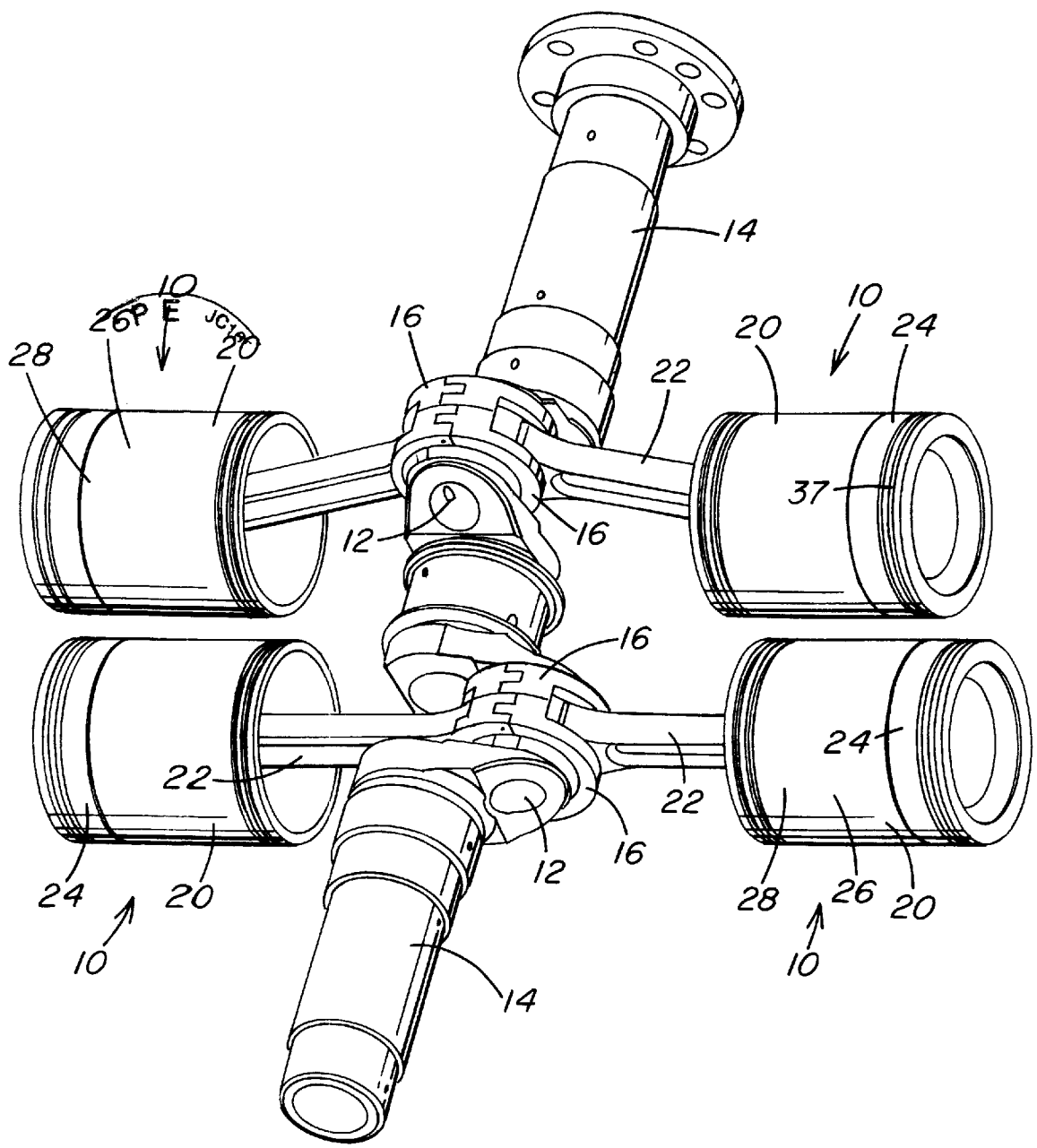
FIG. 1 is an isometric view of an arrangement of four piston and connecting rod assemblies constructed according to the present invention coupled to a crankshaft in a horizontally opposed orientation.

Referring now to the drawings, which are for the purpose of illustrating embodiments of the invention and not for the purpose of limiting the same, an embodiment of a piston and connecting rod assembly constructed in accordance with the present invention and generally as designated 10 is depicted in FIGS. 1–6. For ease of reference, the piston and connecting rod assembly 10 may be referred to hereafter as the "assembly 10".

FIG. 1 depicts assembly 10 in one possible application, which is as a piston and connecting rod of a four cylinder, two-throw, horizontally opposed internal combustion engine suitable for two-stroke operation, and in that application four assemblies 10 are coupled to the two crankpins 12 of the crankshaft 14 by mounting collars 16. The following detailed description of embodiments of the invention and their component parts are believed to be particularly well-suited for use in internal combustion engines having high cylinder pressure and/or unfavorable connecting rod piston (small) end loading and lubrication, such as in two stroke engines. However, it will be understood that the invention and the particular embodiments of the invention hereinafter described also may be applied to four stroke and other variations of piston engines, and also may be suitable for use in non-engine applications incorporating reciprocating or otherwise movable piston members. Such non-engine applications include, for example, use of the present invention in compressors and slider crank mechanisms. Thus, FIG. 1 is provided only to indicate a possible environment of application for the present invention.

Figure 2:
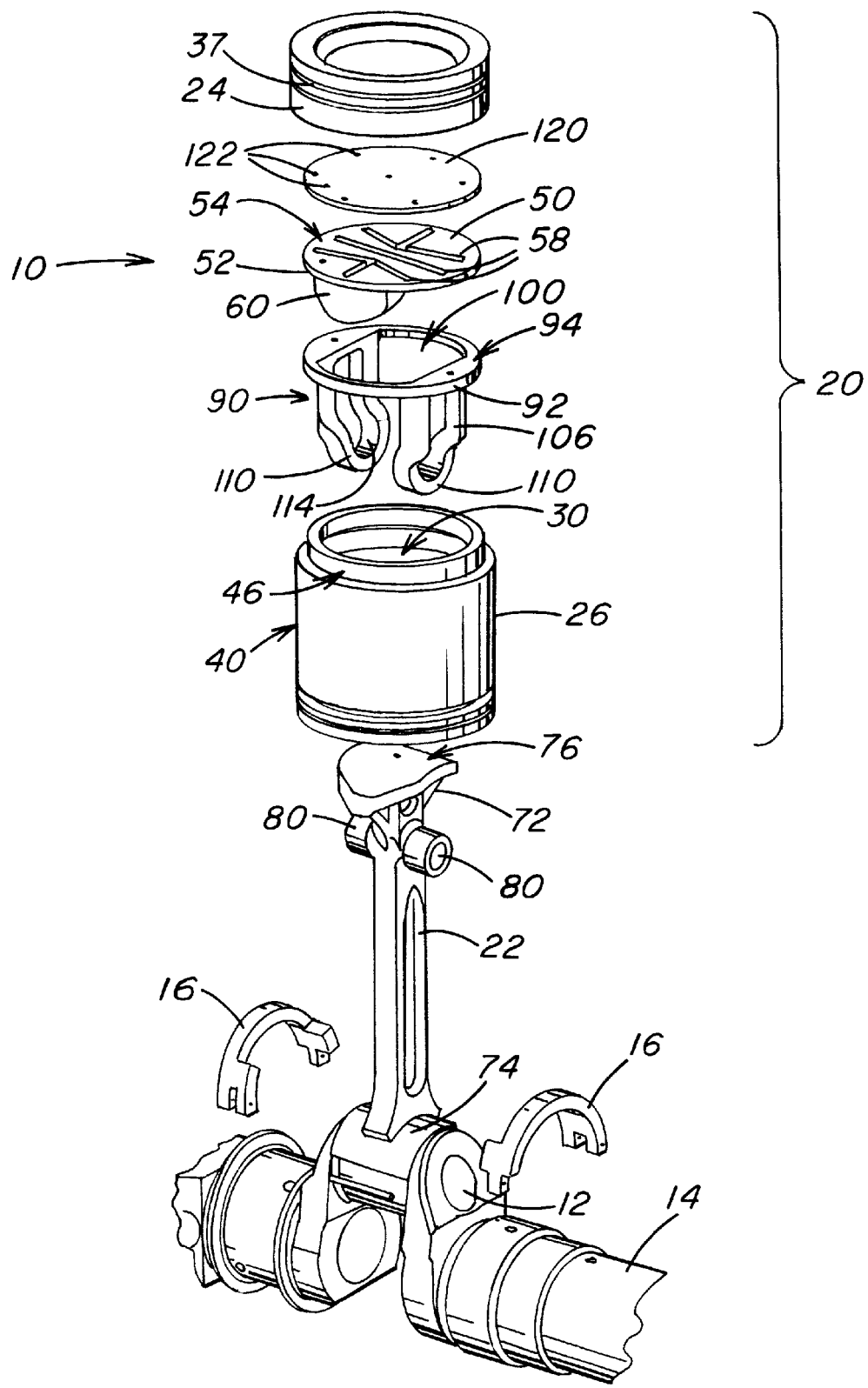
FIG. 2 is an isometric assembly view of one embodiment of a piston and connecting rod assembly constructed according to the present invention illustrating the several elements of the piston and the manner of attachment of the connecting rod to a crankshaft.
Figure 3:
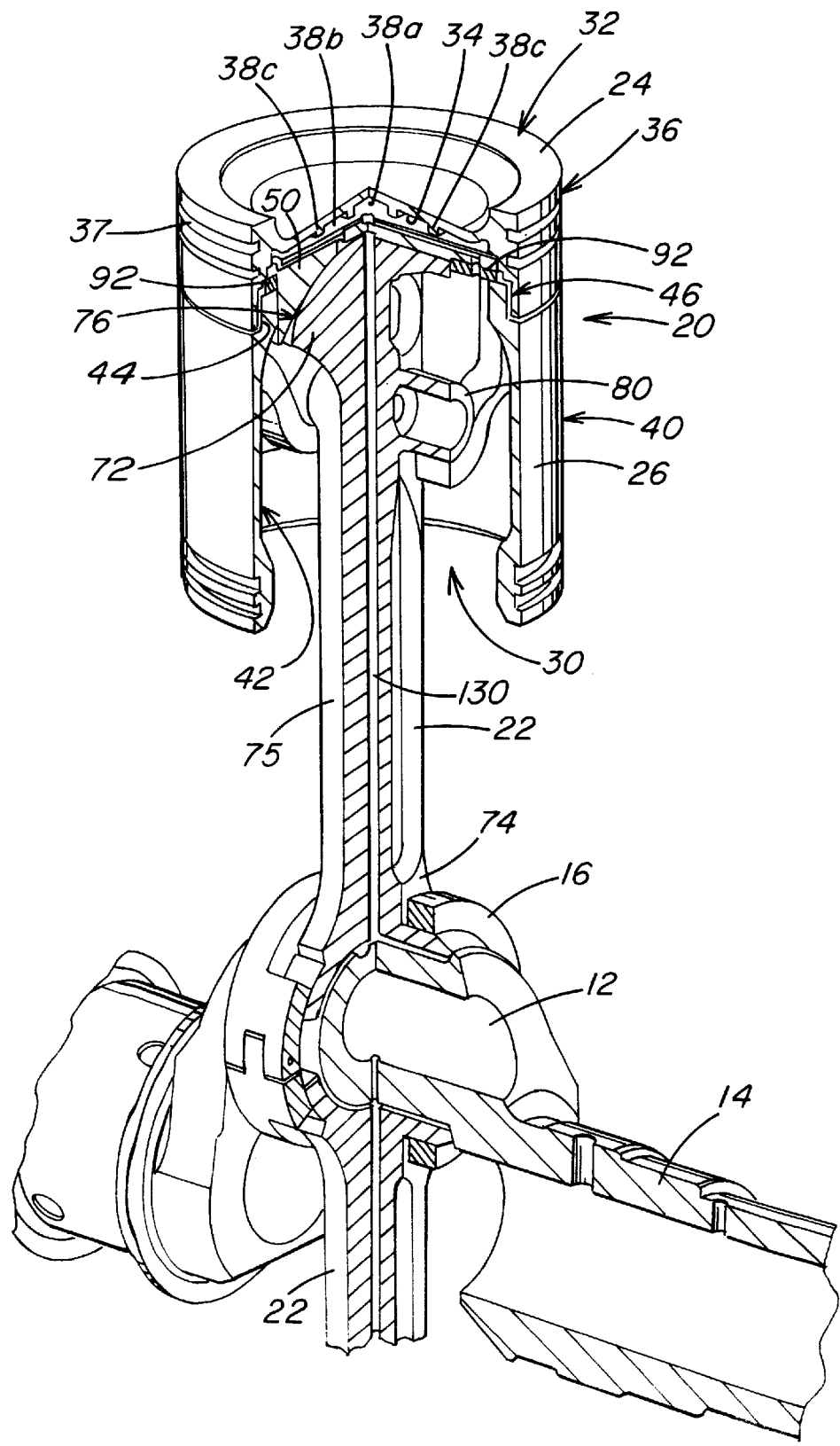
FIG. 3 is a partially sectioned isometric view of the piston and connecting rod assembly and crankshaft region depicted in FIG. 2, and depicts the piston assembled and with the slipper-type bearing of the connecting rod secured via a bearing to the crankshaft.
Figure 4:
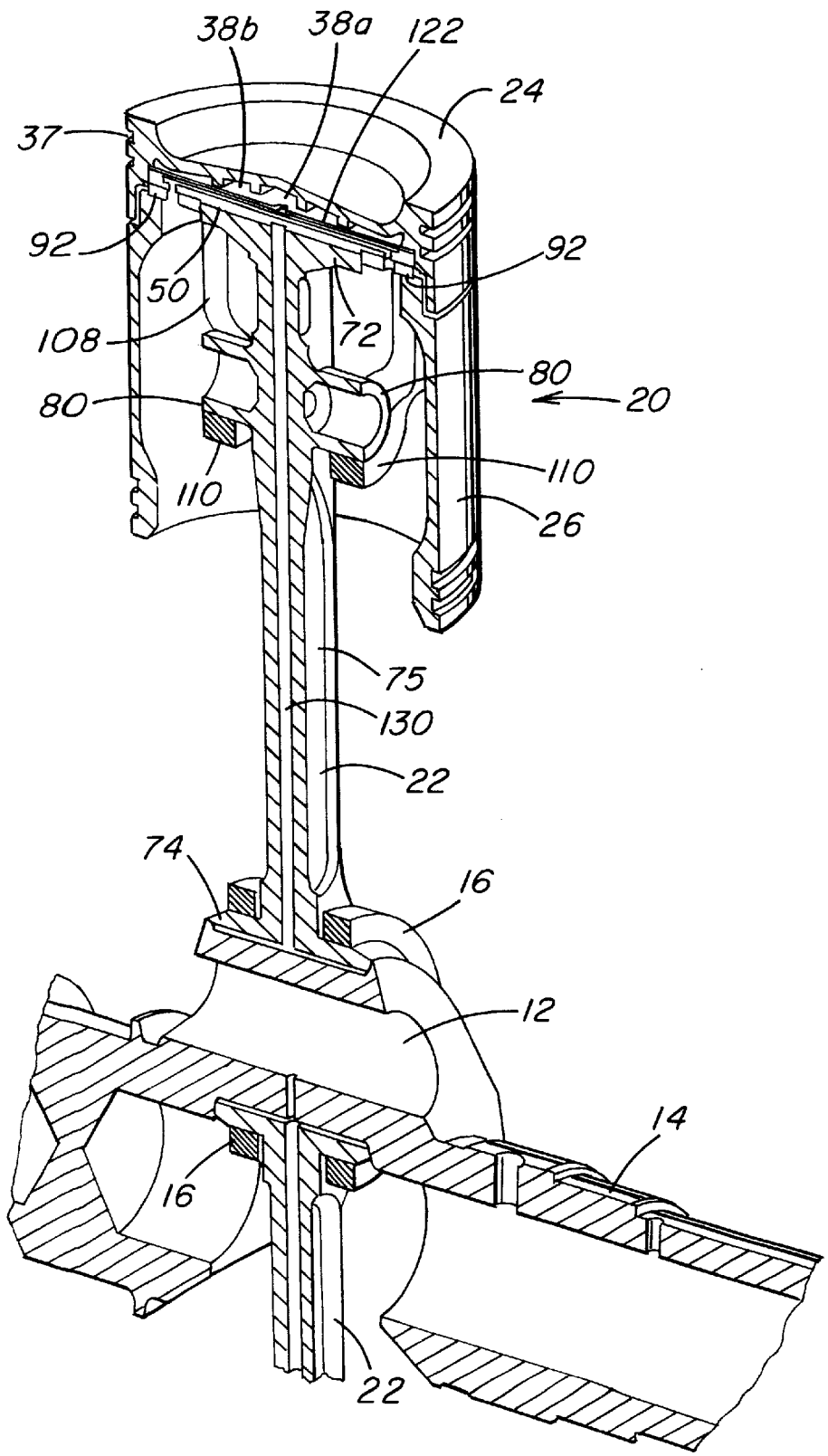
FIG. 4 is a sectioned isometric view of the piston and connecting rod assembly and crankshaft region depicted in FIG. 3, and with the section taken generally along the central longitudinal axes of both the connecting rod and the crankshaft.
Figure 8:
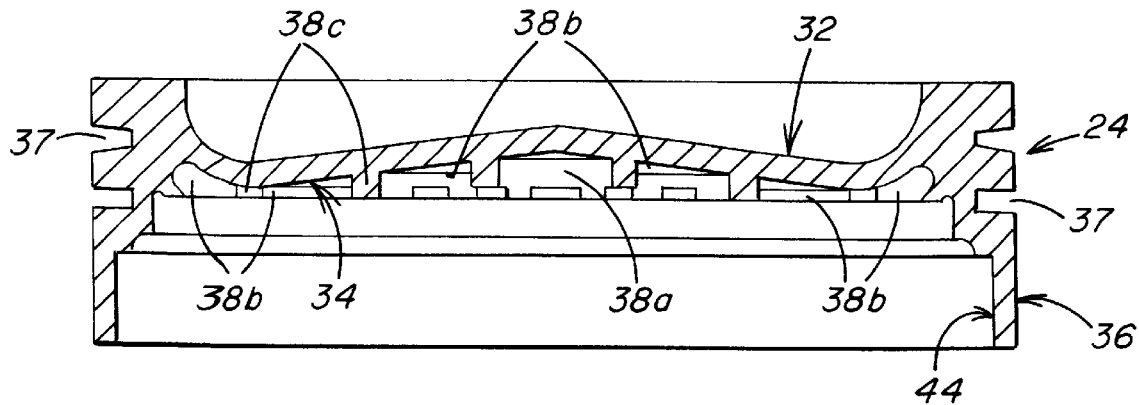
FIG. 8 is a cross-sectional view of the piston crown depicted in FIG. 7 taken generally along line A—A in FIG. 7.
Figure 7:
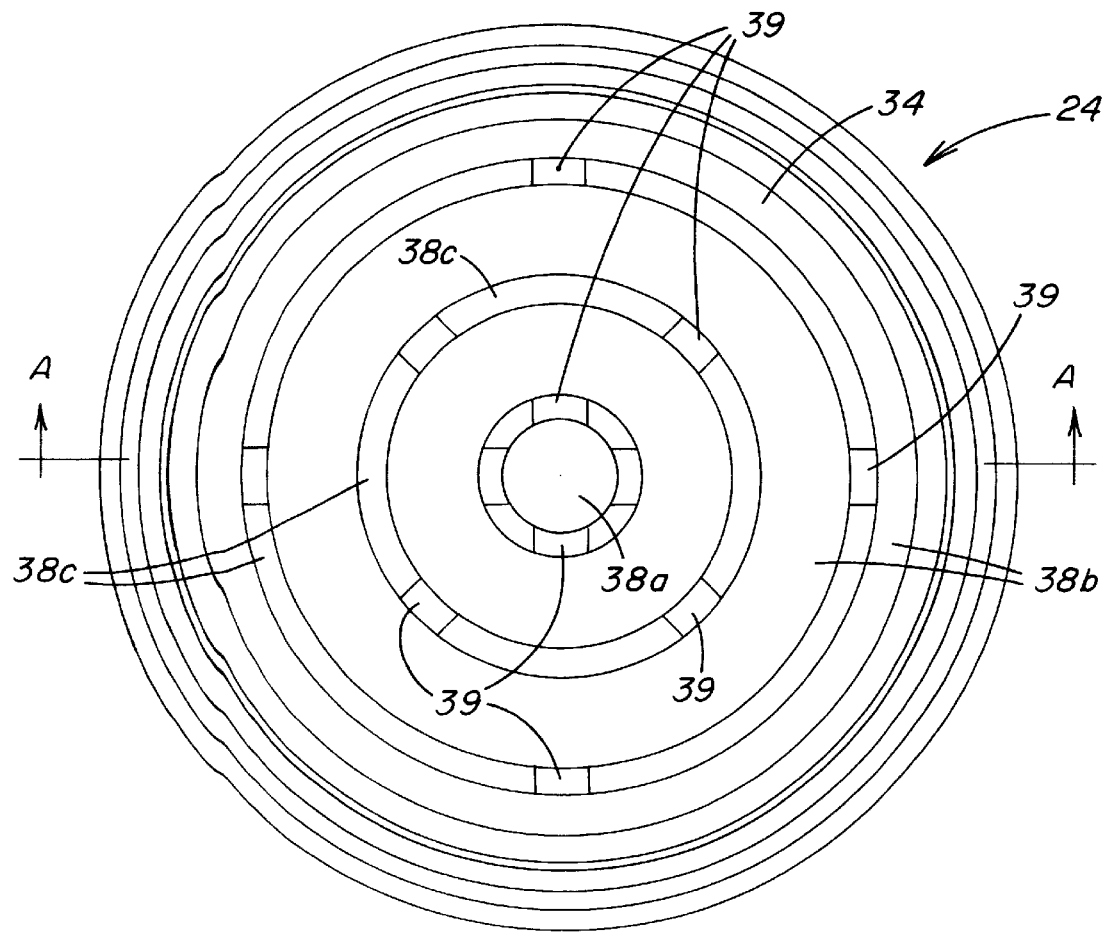
FIG. 7 is a plan view of the inner surface of the piston crown of the piston and connecting rod assembly depicted in FIGS. 2–6.
Figure 9:
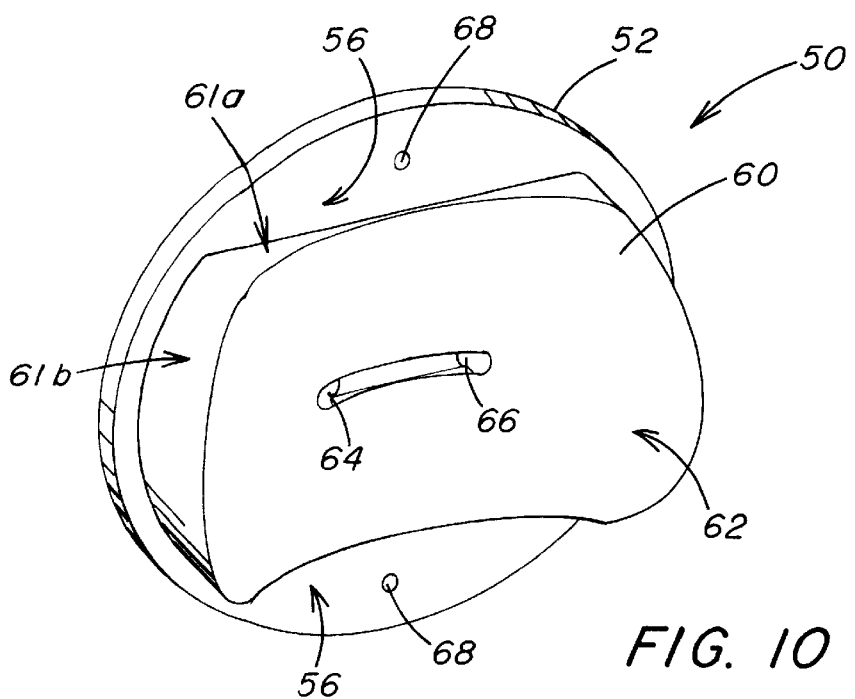
FIG. 9 is an isometric view of the bearing insert of the piston and connecting rod assembly depicted in FIGS. 2–6, and generally showing the bearing and second surfaces of the bearing insert.
Figure 10:
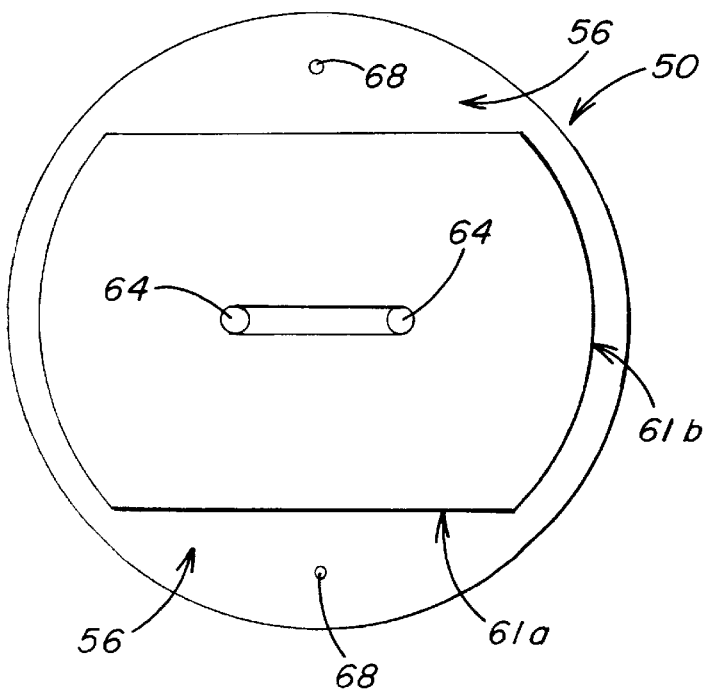
FIG. 10 is a plan view of the bearing insert depicted in FIG. 9, and depicting the bearing and second surfaces of the bearing.
Figure 11:
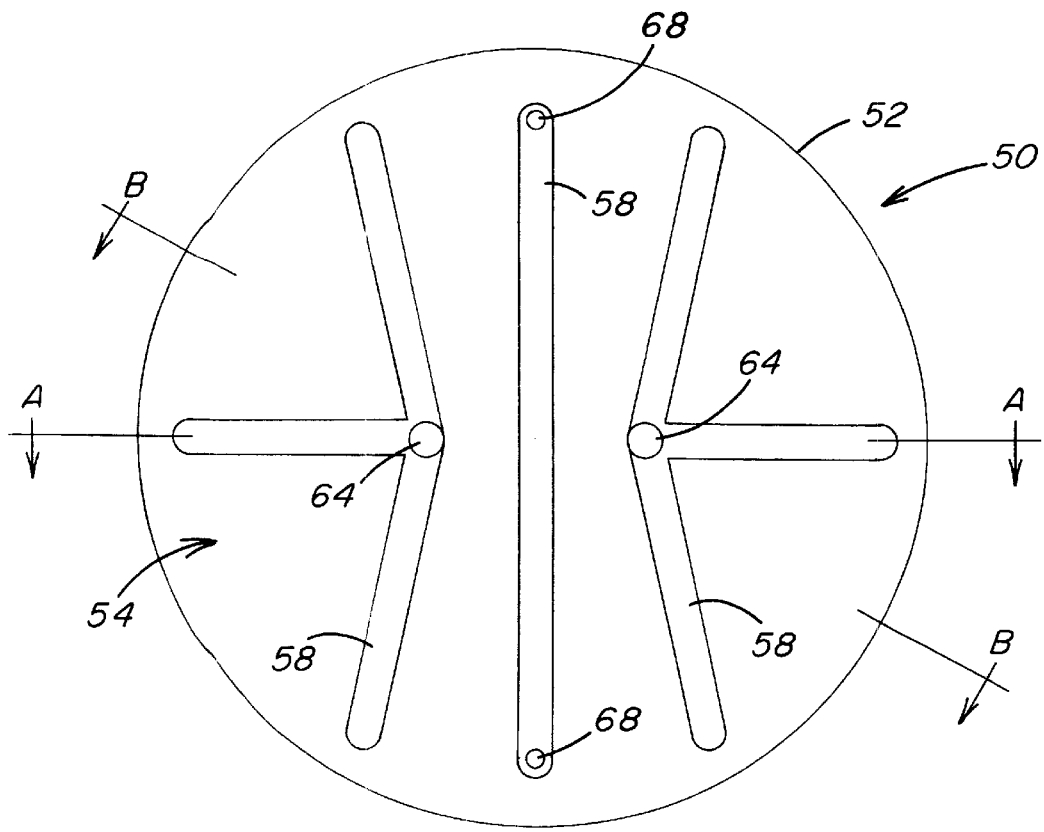
FIG. 11 is a plan view of the bearing insert depicted in FIGS. 9 and 10, and depicting the first surface of the bearing insert, disposed proximate the piston crown.
Figure 12:
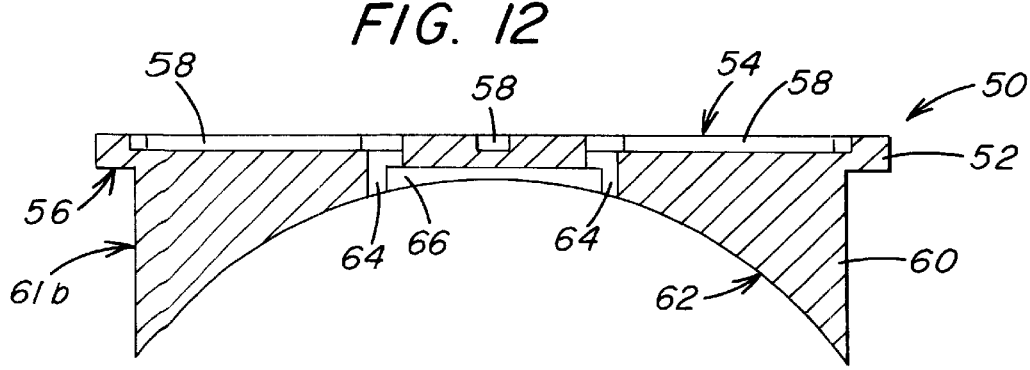
FIG. 12 is a cross-section of the bearing insert depicted in FIGS. 9–11, and taken generally along line A—A in FIG. 11.
Figure 13:
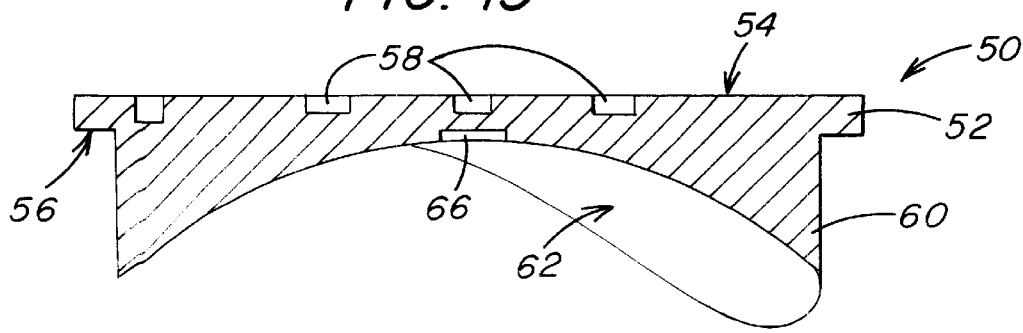
FIG. 13 is a cross-section of the bearing insert depicted in FIGS. 9–12, and taken generally along line B—B in FIG. 11.
Figure 14:
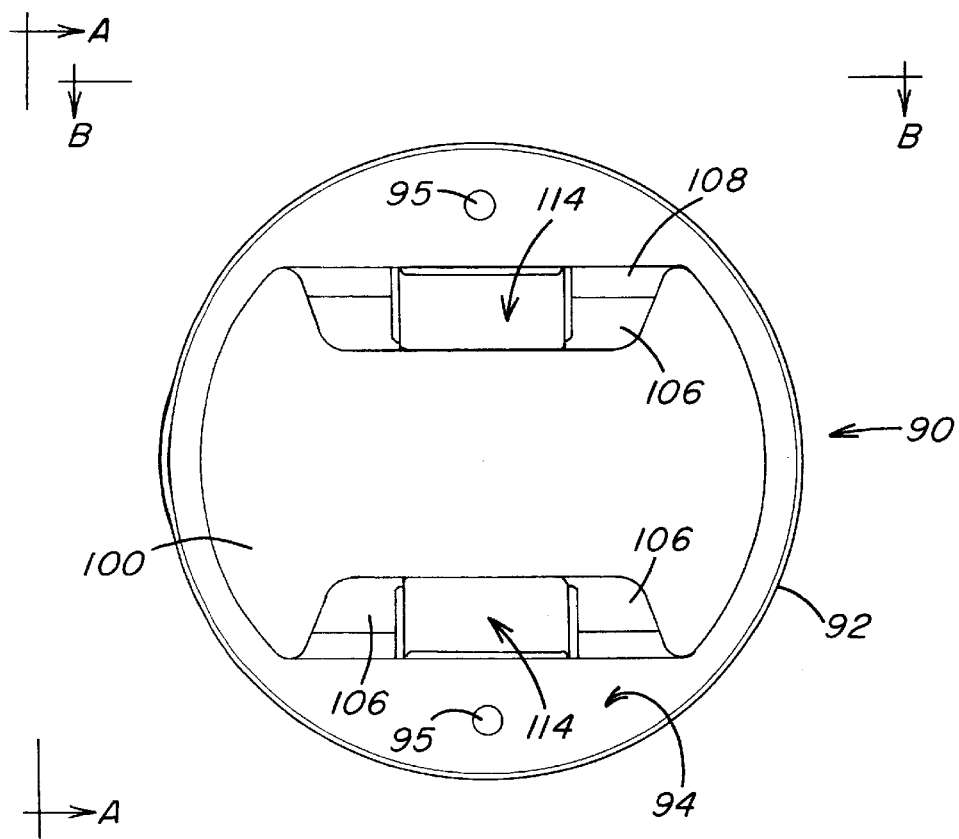
FIG. 14 is a plan view of the top-of-stroke inertia reaction retainer of the piston and connecting rod assembly depicted in FIGS. 2–6, and taken from the region of the retainer proximate the piston crown and toward the region proximate the slipper-type bearing of the connecting rod.
Figure 15:
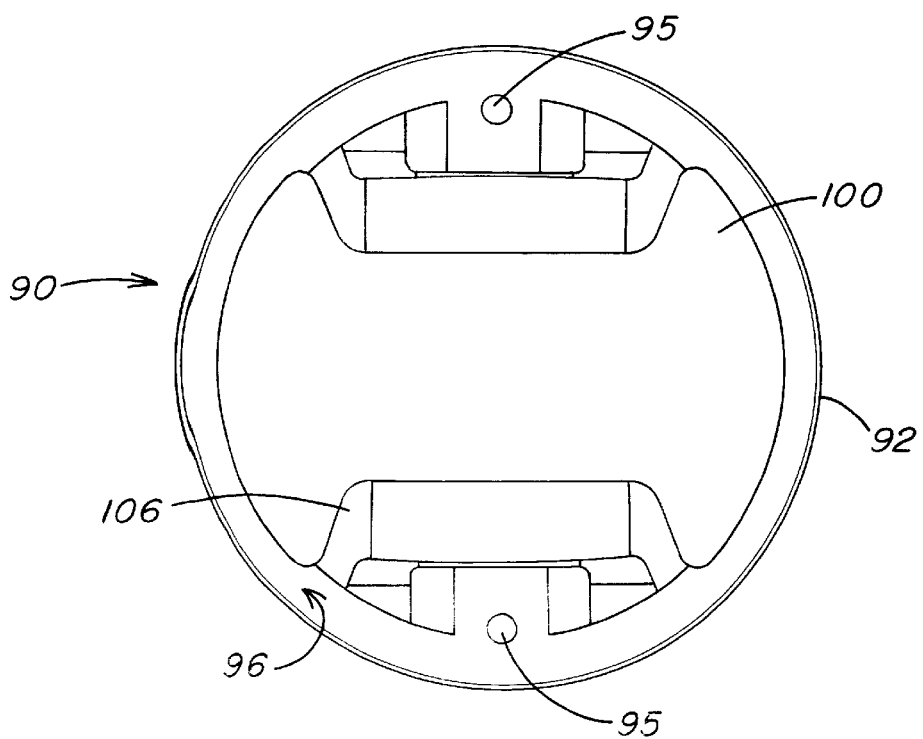
FIG. 15 is a plan view of the top-of-stroke inertia reaction retainer depicted in FIG. 14, and taken from the region of the retainer proximate the slipper-type bearing of the connecting rod and toward the region proximate the piston crown.
Figure 16:
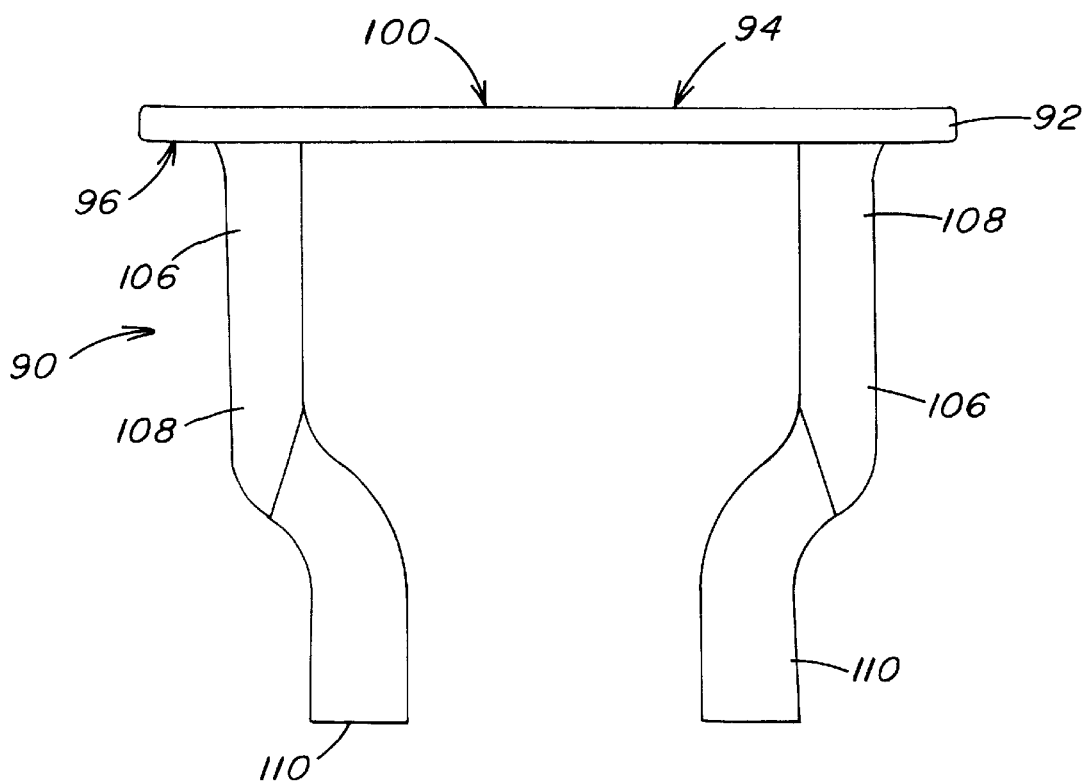
FIGS. 16 and 17 are side views of the top-of-stroke reaction retainer depicted in FIGS. 14 and 15 taken generally in the direction of lines A—A and B—B, respectively, of FIG. 14.
Figure 17:
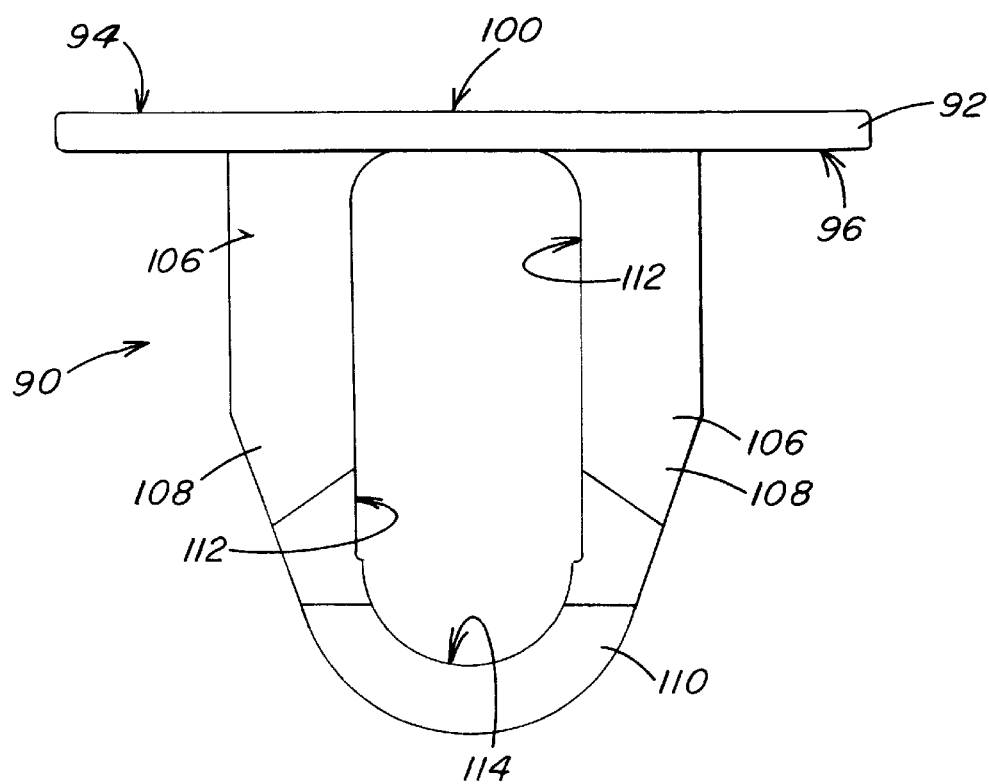

The piston and connecting rod assembly 10 of the present invention generally includes a piston 20 having multiple components and a connecting rod 22. The piston 20 and the connecting rod 22 are associated as hereinafter described. As illustrated in FIG. 2, piston 20 includes a cylindrical piston crown 24 and a cylindrical, hollow piston skirt 26, which may be joined together to provide a piston body 28 having a piston cavity 30 therein. As indicated in FIGS. 2, 3, and 8, the piston crown 24 includes outer surface 32 and inner surface 34. Outer surface 32 includes side surface 36, which may include one or more piston grooves 37. As illustrated in FIGS. 7 and 8, the inner surface 34 of the piston crown 24 includes central circular recess 38a and three circular channels 38b concentric with recess 38b. The channels 38b are separated by raised ridges 38c that are punctuated by passages 39 so that coolant, such as, for example, engine oil, resident in recess 38a and channels 38b may circulate about the inner surface 34, including that portion of the inner surface 34 in the vicinity of the piston grooves 37. The piston skirt 26 includes outer surface 40 and inner surface 42. Annular inner perimeter region 44 of the piston crown 24 includes threads adapted to mate with corresponding threads on an outer perimeter region 46 on the outer surface 40 of the piston skirt 26. The outer perimeter region 46 is recessed relative to the remainder of the outer surface 40 of the piston skirt so that the threaded connection of the piston crown 24 and piston skirt 26 provides a piston body 28 having a generally cylindrical surface. However, it will be understood that the present invention piston body 28 may be configured to have a surface that is other than generally cylindrical, and the required piston body surface configuration will be dictated by the particular application to which the invention is adapted.

In order to securely connect the piston crown 24 and piston skirt 26 together, an interference threaded fit may be achieved as follows. The piston skirt 26, which may be fabricated from aluminum, is cooled to contract the outer perimeter region and reduce the circumference of the male threads. The piston crown 24, which may be fabricated from cast iron, is heated to expand the circumference of the female threads on the inner surface 34. The piston crown 24 and skirt 26 are sized so that the threaded regions may be easily threadedly engaged when the parts have been cooled and heated in that way. After threadedly connecting the cooled piston skirt 26 and heated piston crown 24, the connected parts are then brought to room temperature to provide a secure interference connection between them.

Although the present embodiment 10 of the invention incorporates a threaded connection between the piston crown 24 and piston skirt 26, any suitable alternate arrangement for securely connecting the piston crown 24 and piston skirt 26 together may be used. Such arrangements include, for example, welding, brazing, bolting, shrink fitting, or other conventional joining and locking methods.

Again referring to FIG. 2 and 3, piston 20 further includes a bearing insert 50, which is shown in isolation in several views in FIGS. 9–13. The bearing insert 50 may be manufactured of, for example, aluminum or steel and also may be coated with a suitable bearing material. The bearing insert 50 includes a circular disk-shaped mounting portion 52 having a first surface 54 and a second surface 56. First surface 54 includes several coolant channels in the form of recesses 58 radiating from a central region of the first surface 54 to a perimeter region of that surface. A raised bearing portion 60 having a perimeter including opposed parallel, generally planar sides 61a and opposed curved sides 61b protrudes from a region of the second surface 56 and includes a bearing surface 62. The bearing surface 62 contacts and movably associates with the connecting rod 22 to provide relative movement between the piston 20 and the connecting rod 22 as described hereinafter.

The bearing insert 50 also includes two holes 64. Each hole 64 opens into a separate channel 58 on the insert's first surface 54 and into a single recess or slot 66 in the bearing surface 62 of the bearing portion 60. Bearing insert 50 also includes holes 68 formed through mounting potion 52 between the first and second surfaces 54 and 56, respectively. Each hole 68 opens into the end of a channel 58 on the first surface 54 and opens on the second surface 56 adjacent a planar side 61a of the bearing portion 60. As described below, channels 58, bores 64, recess 66, and holes 68 form elements of a circulation pathway for coolant and/or lubricant or other liquids within the piston body and, in particular, are components of a fluid circulation pathway to and from the inner surface 34 of the piston crown 24.

Figure 19:
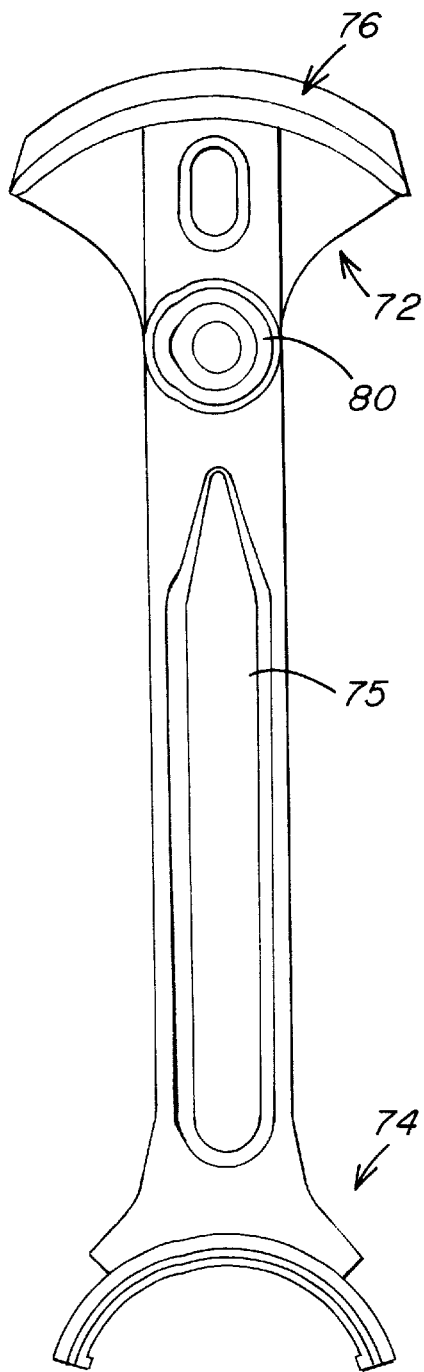
FIGS. 18 and 19 are plan views of the connecting rod of the piston and connecting rod assembly depicted in FIGS. 2–6.
Figure 18:
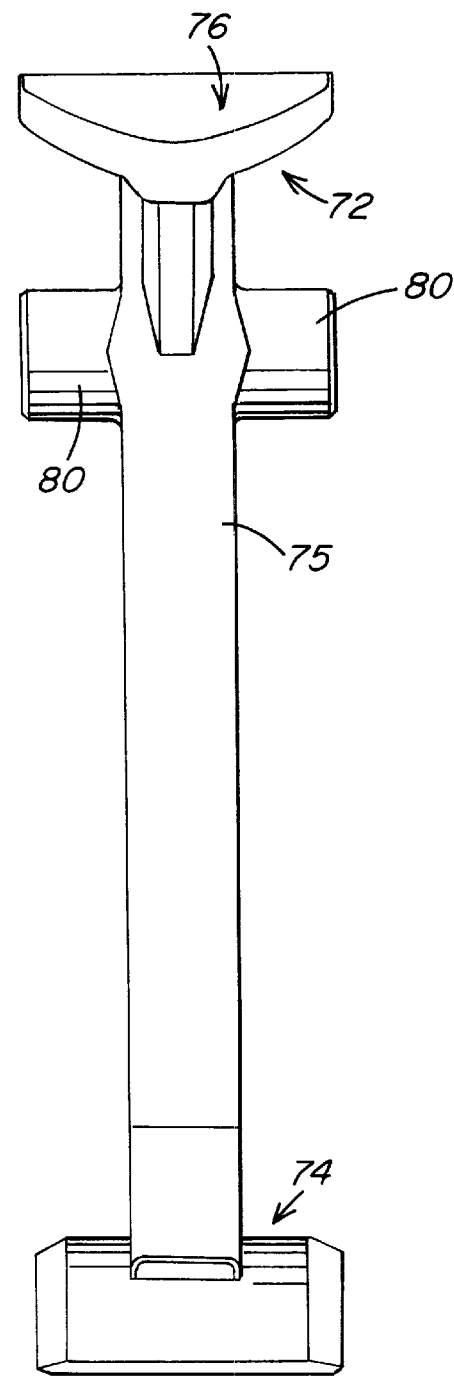
Figure 22:
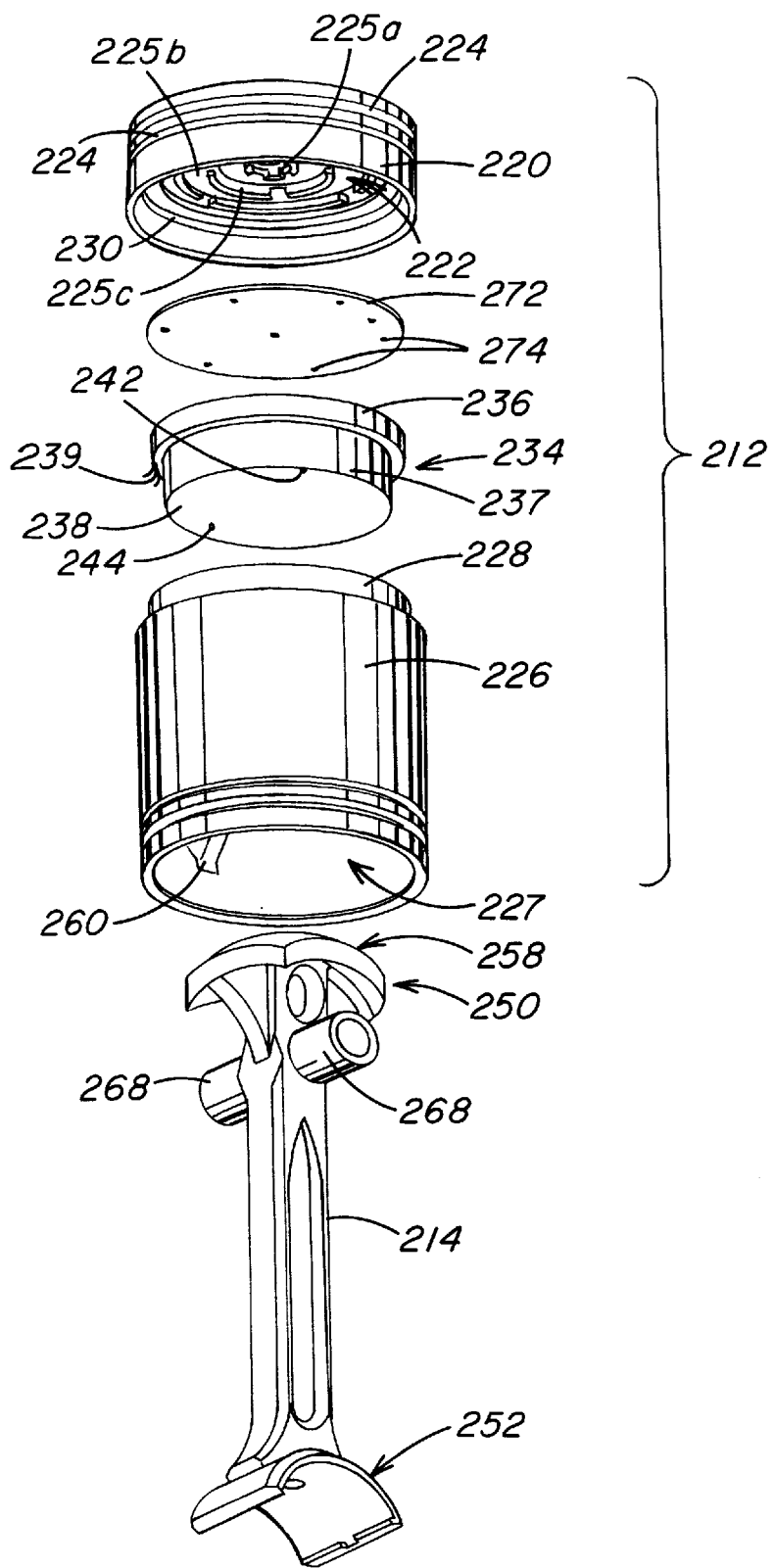
FIG. 22 is an isometric assembly view of a second embodiment of a piston and connecting rod assembly constructed according to the present invention.

To provide for relative movement of the connecting rod 22 and the piston body 20 as the piston body 20 reciprocates within a piston cylinder (not shown) and, for example, rotates crankshaft 14 of FIG. 1, the assembly 10 includes specially configured connecting rod 22 having a piston or first end 72, a crankshaft or second end 74, and an elongate intermediate region 75. Connecting rod 22 is best shown in relation to the assembly's other elements in FIGS. 2–6 and in isolation in FIGS. 18 and 19. First end 72 includes a bearing surface 76 that contacts bearing surface 62 of bearing member 50 within the piston body 28 and may articulate with the bearing surface 62 as the orientation of the connecting rod 22 changes relative to the piston body 20. The interface between bearing surfaces 62 and 76 thereby provides a "joint" about which the connecting rod 22 and the piston body 28 may move. Changes in relative orientation between the connecting rod 22 and the piston body 28 will occur in the piston internal combustion engine design partially illustrated in FIG. 1 as the crankshaft 14 rotates and the longitudinal axis of a particular connecting rod 22 moves relative to the plane within which the central axes of the piston bodies 28 reside.

Figure 6:
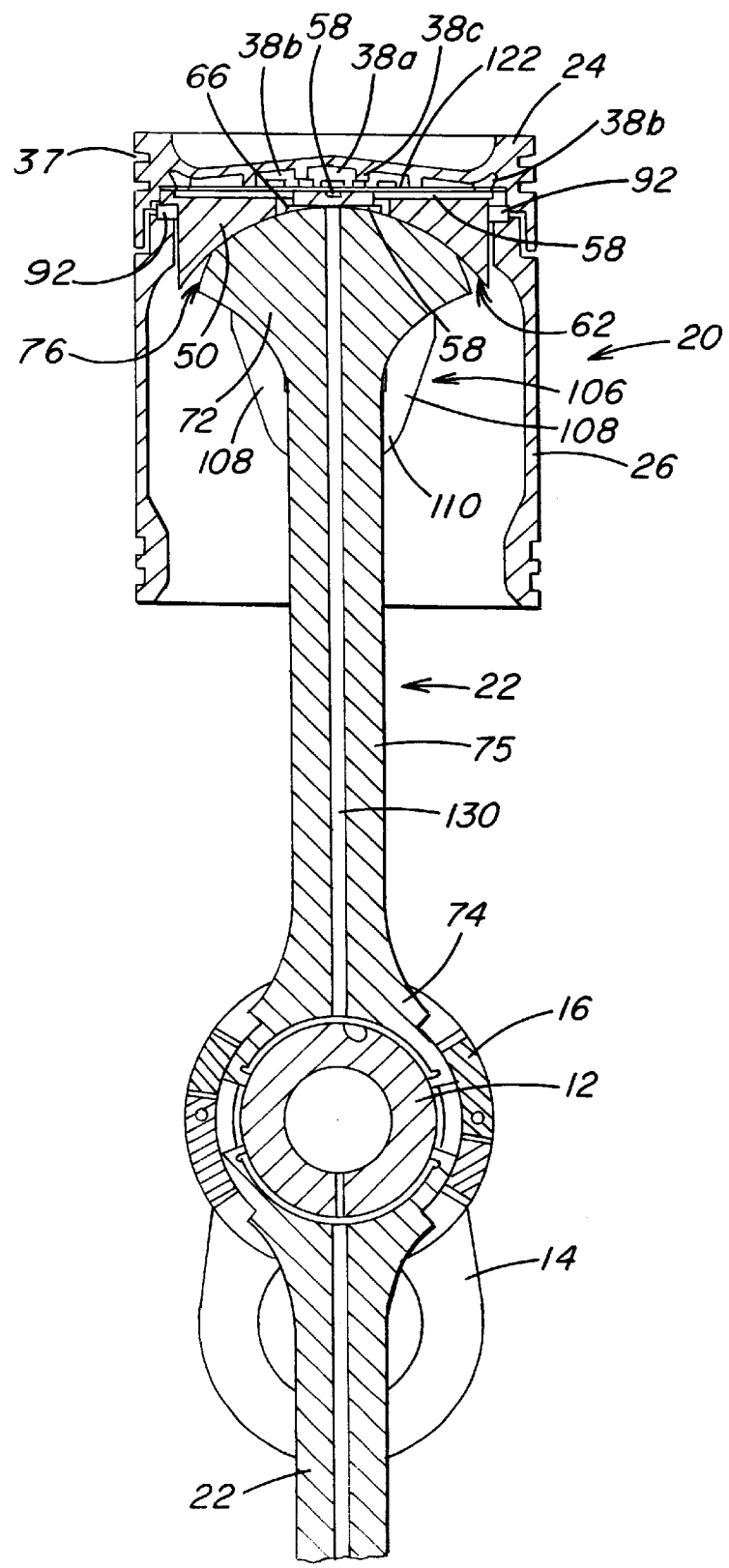
FIG. 6 is a cross-sectional view of the piston and connecting rod assembly and crankshaft region illustrated in FIGS. 3–5, and with the section taken generally along the central longitudinal axis of the connecting rod and transversely through the longitudinal axis of the crankshaft.

In present assembly 10, to allow the bearing surfaces 62 and 76 to articulate, the bearing surfaces include regions capable of mating. That mating relationship is indicated in, for example, FIGS. 3 and 6, which show a region of the convex bearing surface 76 of the connecting rod 22 nested within the concave bearing surface 62 of the bearing insert 50. In assembly 10, the mating relationship between bearing surfaces 62 and 76 and the capability to articulate is provided by shaping a region of the bearing surface 76 as a portion of the exterior of a cylinder defined by a given radius of curvature. A conforming region of the bearing surface 62 is shaped as a region of the interior surface of a cylinder defined by an approximately equal radius of curvature. Thus, as indicated in FIGS. 3 and 6, the conforming regions of the bearing surfaces 62 and 76 may nest within one another to form a joint between the connecting rod 22 and the piston body 28 that may articulate.

Although assembly 10 incorporates conforming regions of bearing surfaces 62 and 76 shaped as regions of structures defined by a cylindrical radius of curvature, bearing surfaces 62 and 76 having regions of other shapes and that suitably mate to provide sufficient articulation between the connecting rod 22 and the piston body 28 may be used. As examples, a piston and connecting rod assembly 10 of the present invention may be provided with bearing surfaces 62 and 76 shaped as regions of barrel-shaped or spherical structures (such as in the embodiment 210 described below).

Certain mating shapes may be useful when the extent and directions of relative movement between the connecting rod and piston body in a particular engine or other application are taken into account. For example, in a particular internal combustion engine movement of the piston cylinder relative to the crankshaft results in certain cyclic relative movements between the longitudinal axis of a connecting rod and the longitudinal axis of a piston body, and such relative movements may make certain articulating capabilities between the connecting rod and the piston body advantageous. Although assembly 10 includes a convex-shaped bearing surface 76 and a concave-shaped bearing surface 62, it will be understood that if suitably configured the requisite degree of articulation between those surfaces may be achieved by designing the bearing surface 76 of the connecting rod 22 as a concave-shaped surface and the bearing surface 62 of the bearing insert 50 as a convex-shaped surface, each surface wholly or partially mating and providing the necessary articulating joint. Other bearing surface shapes providing the necessary mating and articulating capabilities between connecting rod 22 and bearing insert 50 will be evident to those having ordinary skill in the art upon consideration of the present disclosure.

In the embodiment of the present invention shown as assembly 10, the width of the bearing surface 76, indicated as "W" in FIG. 20, of first end 72 is equal to or greater than conventional piston pin lengths, and the bearing surface 76 is defined by a large cylindrical radius and mates with a bearing surface 62 of similar width and radius of curvature. This arrangement provide the effect of a conventional piston pin having a very large diameter.

Connecting rod 22 of assembly 10 further includes a pair of generally cylindrical pivot elements in the form of coaxial pivot projections 80, which extend outward from the intermediate region 75 of the connecting rod 22 in the vicinity of the first end 72. Each pivot projection 80 has an axis that is generally transverse to the longitudinal axis of the intermediate region 75. The pivot projections 80 co-act with other portions of the assembly 10 as described below to secure bearing surface 62 in movable association with bearing surface 76.

Second end 74 of the connecting rod is configured to couple to crankpin 12 of crankshaft 14. As an example, in assembly 10 second end is of the "slipper" type and is connected via a bearing to crankpin 12 by mounting collars 16. Other, conventional configurations of the second end 74 of the connecting rod 22 that may be used to facilitate coupling the assembly 10 to crankpin 12 of the crankshaft 14 will be apparent to those having ordinary skill in the art and, therefore, such conventional configurations are not discussed herein.

The assembly 10 of the present invention further includes a retainer in the form of a top-of-stroke reaction retainer 90, which is shown in FIG. 2 and is shown in isolation in several views in FIGS. 14–17. Retainer 90 includes amounting portion 92 having a circular perimeter. Mounting portion 92 includes a first surface 94, a second surface 96, two holes 95 between those surfaces, and a void 100 therethrough. The void 100 is sized so that the bearing portion 60 of the bearing insert 50 may be disposed through the void 100 and the bearing insert 50 may nest within the retainer 90 with the second surface 56 of the mounting portion 52 of the bearing insert 50 contacting the first surface 96 of the mounting portion 92 of the retainer 90. The nesting relationship of bearing portion 60 within the void 100 of the mounting portion 92 of retainer 90 is indicated by the layout of elements in the assembly view of FIG. 2 and is shown in the several sectional views of FIGS. 3–6. Again referring to FIGS. 14–17, retainer 90 also includes two bearing elements 106 that depend from mounting portion 92 in an opposed relationship flanking void 100. Each bearing element 106 is an arch-shaped member having two leg portions 108, a curved terminal region 110, and an inner surface 112. The retainer 90 maintains a connection between the connecting rod 22 and the piston 20. Specifically, inner surface 112 within the curved terminal region 110 of each bearing element 106 provides a concave pivot surface 114 on which the pivot projections 80 of the connecting rod 22 may pivot as the connecting rod 22 articulates with the piston 20.

It will be understood that in two-stroke combustion engines the retainer 90 will be unloaded during normal engine operation. The function of the retainer 90 in such engines is to provide a down-stroke force linking the piston 20 to the connecting rod 22 at cranking and in failure modes that result in loss of cylinder pressure. In four stroke engines, however, the retainer 90 will be loaded during normal engine operations and, therefore, the pivot surface 114 may be surfaced with a suitable bearing material.

That association of the bearing insert 50 and retainer 90 in the piston body 28 will be understood from the following description of the assembly of the various elements of the piston and connecting rod assembly 10.

The second end 74 of the connecting rod 22 is inserted into the void 100 of the retainer 90 and is advanced through the void 100 until each pivot projection 80 of the connecting rod 22 is nested within a curved terminal region 110 of the retainer 90. The connecting rod 22 and the retainer 90 are then disposed in the interior volume of the piston skirt 26 so that the second surface 96 of the mounting region 92 of the retainer contacts the piston skirt 26. The bearing portion 60 of the bearing insert 50 is disposed through the void 100 of the retainer and the bearing surface 62 of the bearing insert 50 contacts the bearing surface 76 of the connecting rod 22. The piston crown 24 is then connected to the piston skirt 26 by threadedly engaging those members as described above, and the mounting portions 52 and 92, respectively, of the bearing insert 50 and retainer 90 are captured between the piston crown 24 and piston skirt 26 to thereby retain the bearing insert 50 and the retainer 90 within the piston body 28, and also maintain the connection of the retainer and the connecting rod 22. In particular, it will be understood that the connecting rod 22 is trapped between the bearing surface 62 of the bearing insert 50 and the curved region 110 of the retainer's 90 bearing elements 106.

Figure 5:
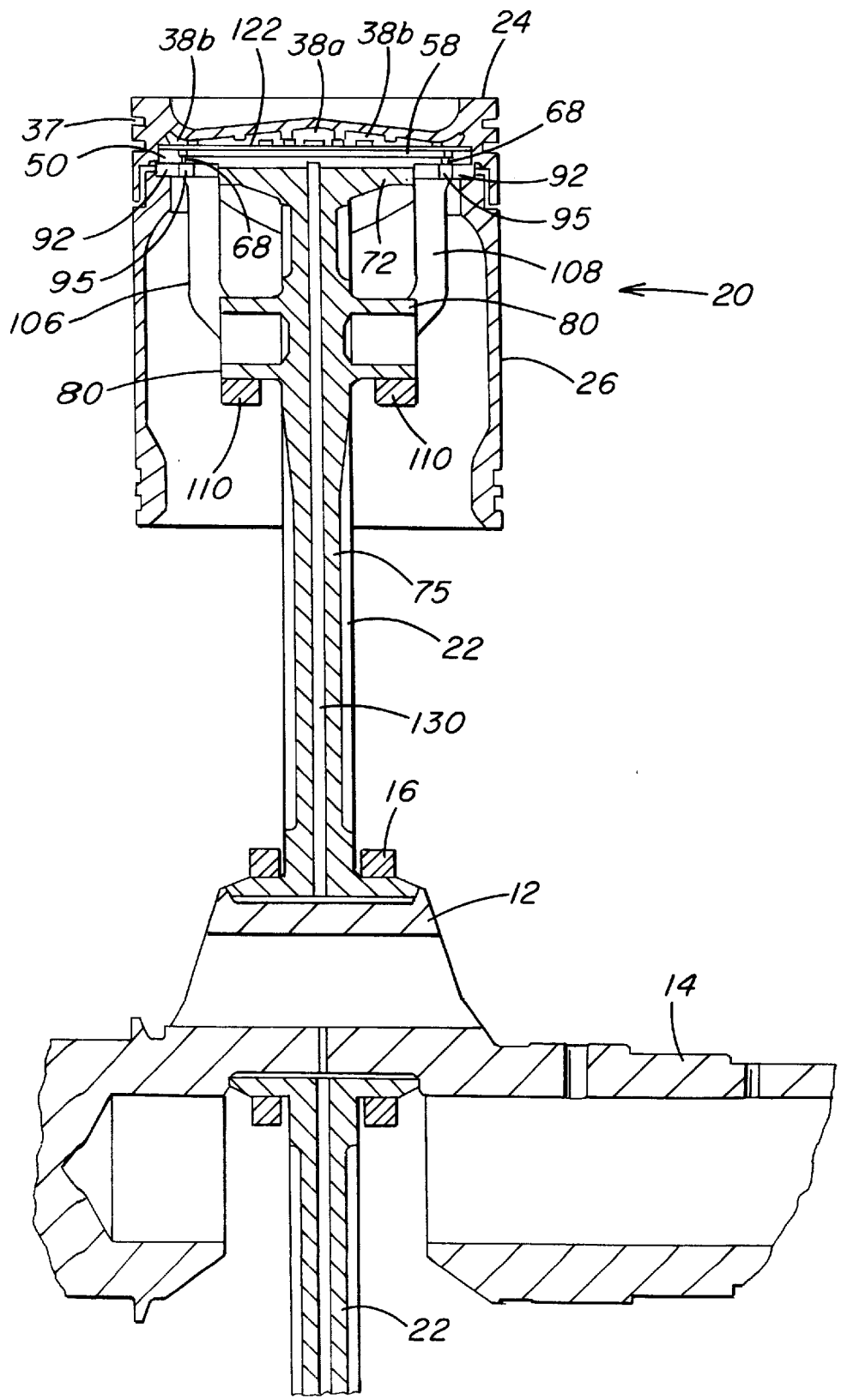
FIG. 5 is a cross-sectional view of the piston and connecting rod assembly and crankshaft region depicted in FIGS. 3 and 4, and with the section taken generally along the central longitudinal axes of both the connecting rod and the crankshaft.

In addition to the foregoing elements, assembly 10 also may include a separator in the form of a crown-to-insert separator plate 120 shaped as a circular disk and having a plurality of bores 122 therethrough. The separator plate 120 is disposed within the piston body 128 between the first surface 54 of the bearing insert 50 and the inner surface 34 of the piston crown 24. As shown in FIGS. 5 and 6, the separator plate 120 has a diameter such that its perimeter region is captured between the piston crown 24 and the piston skirt 26 when those two elements are threadedly or otherwise connected together, and the separator plate 120 forms a thermal barrier between bearing insert 50 and the inner surface 34 of the piston crown 24. The separator plate 120 may be fabricated from a low weight and low thermal conductivity material, such as, for example, titanium, ceramic, and certain low thermal conductivity composite materials, that would reduce heat transfer from the piston crown 24 to the bearing insert 50. Such materials will be readily apparent to those of skill in the art upon consideration of the present disclosure. Lower heat transfer to the bearing insert 50 from the piston crown 24 would provide lower bearing insert and connecting rod temperatures, greater oil film thickness between the bearing surfaces 62 and 76, and a consequent lower bearing wear rate at the interface between the bearing surfaces 62 and 76. The separator plate 120 is assembled into the assembly 10 by placing the separator plate 120 onto the first surface 54 of the bearing insert 50 and then threadedly or otherwise connecting the piston crown 24 to the piston skirt 26.

The piston and connecting rod assembly 10 of the present invention provides a continuous pathway among its various elements for the circulation of liquids, such as, for example, engine oil, and gases. The following discussion will refer to engine oil only, but it will be understood that the pathway may transport other liquids or gases. The engine oil may function as a coolant and/or a lubricant at various locations throughout the assembly 10. As illustrated in FIGS. 3–6, the connecting rod 22 includes a passageway 130 through the length of its central axis for transporting engine oil from the crankpin 12 into the piston body 28 and also for cooling the connecting rod 22. The engine oil enters the connecting rod 22 under pressure at port 132 on the rod's second end 74 (see FIG. 21) and exits at port 134 centrally located on bearing surface 76 of the rod's first end 72 (see FIG. 20). As shown in FIG. 6, the port 134 opens into the recess 58 formed in the bearing surface 62 of the bearing insert 50. The recess 58 is sized so that the port 134 opens into the recess 58 through the range of relative motion of bearing surface 62 and 76. The delivery of engine oil to the bearing insert 50 will provide an oil film between the bearing surfaces 62 and 75. The pressurized engine oil delivered to the recess 58 is forced through the two bores 64 which pass from the recess 58 into two of the radiating channels 58 on the first surface 54 of the bearing insert 50, thereby cooling the bearing insert 50. The engine oil then is forced from the channels 58 into overlying ports 122 in the separator plate 120, which is disposed on the first surface 54 of the bearing insert 50, and into the recess 38a and channels 38b on the inner surface 34 of the piston crown 24. The separator plate 120 may be constructed so as to initially direct the engine oil from the bearing insert 50 to the region within the piston crown 24 adjacent the piston ring grooves 37. The recess 38a and channels 38b on the inner surface 34 also may be arranged so that the circulation of engine oil to the inner surface 34 begins at the region adjacent the piston ring grooves 37. Arranging the engine oil circulation in that way provides the maximum cooling effect to the piston rings, resulting in lower ring temperatures and reduced piston ring wear rates. In embodiments of the present invention lacking a separator plate 120, the engine oil may enter the recess 38a and channels 38b on the inner surface directly from the bearing insert, without passing through the intermediate separator element, but the separator plate 120 provides the twin advantages of reducing heat transfer from the piston crown to the bearing surfaces 62 and 75 and providing an element that may be configured to advantageously direct the flow of engine oil to and from the piston crown 24.

Engine oil may exit from the recess 38a and channels 38b on the piston crown's inner surface 34 by passing through ports 122 in the separator plate 120 overlying the particular channel 58 on the first surface 54 of the bearing insert 50 that includes holes 68. Holes 68, in turn, are aligned with the holes 95 through the mounting portion 92 of the retainer 90, and engine oil introduced into holes 68 at the ends of the central channel 58 is forced by pressure through holes 95 and into the interior cavity of the piston skirt 26, where it may return to the engine oil sump and be recirculated throughout the engine. The overlying arrangement of the central channel 58, holes 68, and holes 95 is illustrated in the sectional views of FIGS. 4 and 5, for example. If the assembly 10 lacks the separator plate 120, then the engine oil is forced by oil pressure from the cavity between the inner surface of the piston crown 24 the first surface 54 of the bearing insert, directly through the aligned 68 and 95 through the mounting portions of both the bearing insert 50 and retainer 90, without having passed through the separator plate 120.

An alternate embodiment of the piston and connecting rod assembly of the present invention, generally designated as 210, is shown in FIGS. 22–26. The assembly 210 also is particularly useful in two stroke internal combustion engines and may, for example, be incorporated into the piston, rod, and crankshaft assemblage of FIG. 1 in substitution for assemblies 10.

Assembly 210 includes a piston 212 and a connecting rod 214. The piston 212 includes a piston crown 220 having a construction identical to that of piston crown 24 of the assembly 10. The piston crown includes an inner surface 222 and an exterior surface that may include annular piston ring grooves 224. The inner surface 222 includes a central recess 225a and circular channels 225b separated by projections 225c, which may be identical in design to the recess 38a, channels 38b, and projections 38c, respectively, of the assembly 10. Assembly 210 also includes a cylindrical piston skirt 226 defining a void 227 therein. Piston skirt 226 includes an annular rim 228 having threads on its exterior surface and which may be securely mated with annular threaded region 230 on inner surface 222 of the piston crown 220 using the interference threaded connecting procedure described in connection with assembly 10. It will be understood, however, that other means of securely connecting the piston crown 220 and the piston skirt 226 may be used, and certain other means of connection will be apparent to those of ordinary skill upon consideration of the present disclosure.

Figure 23:
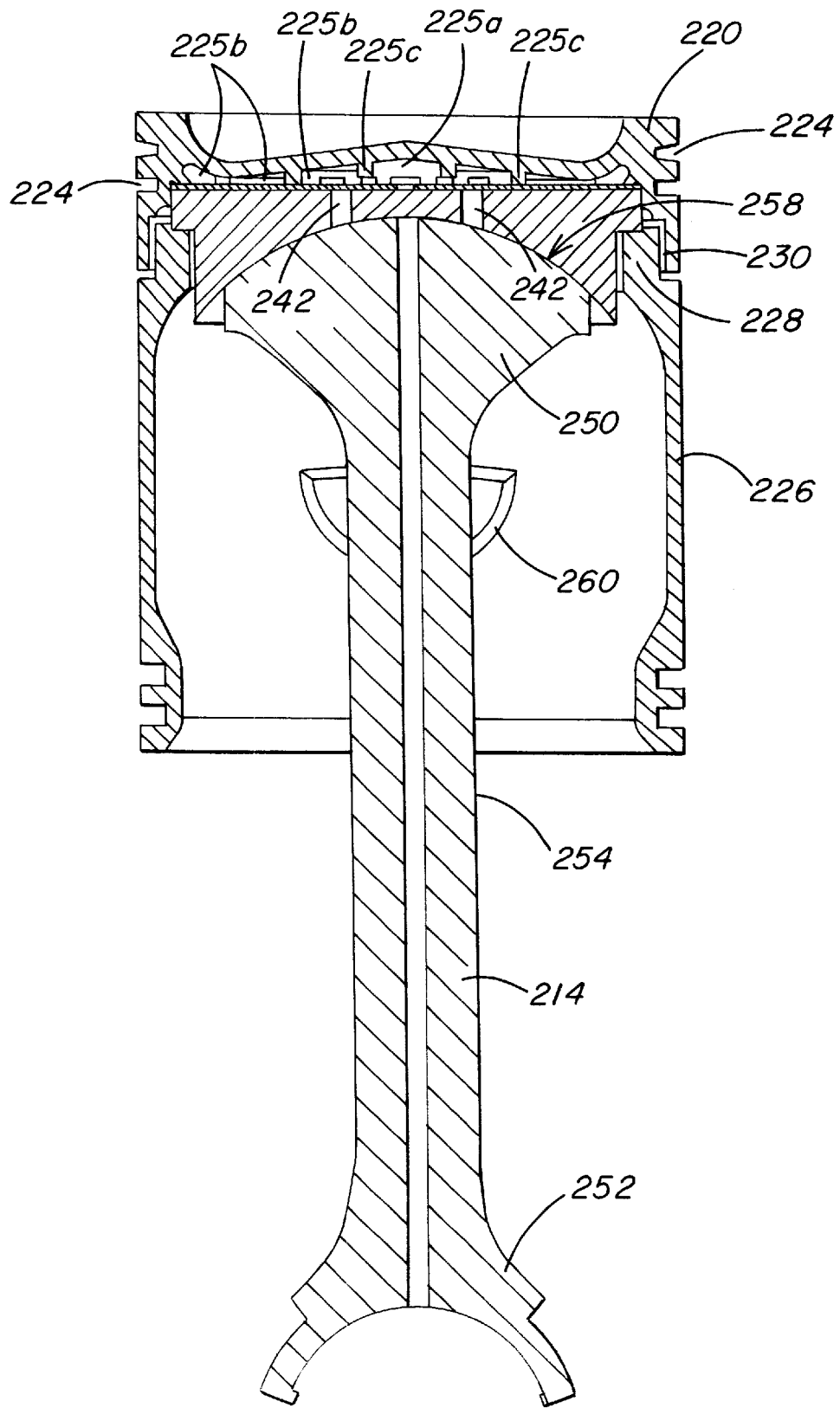
FIGS. 23 and 24 are cross-sectional views of the piston and connecting rod assembly depicted in FIG. 22, showing the assembly assembled and with the section of FIG. 24 taken at 90 degrees to the section of FIG. 23.
Figure 24:
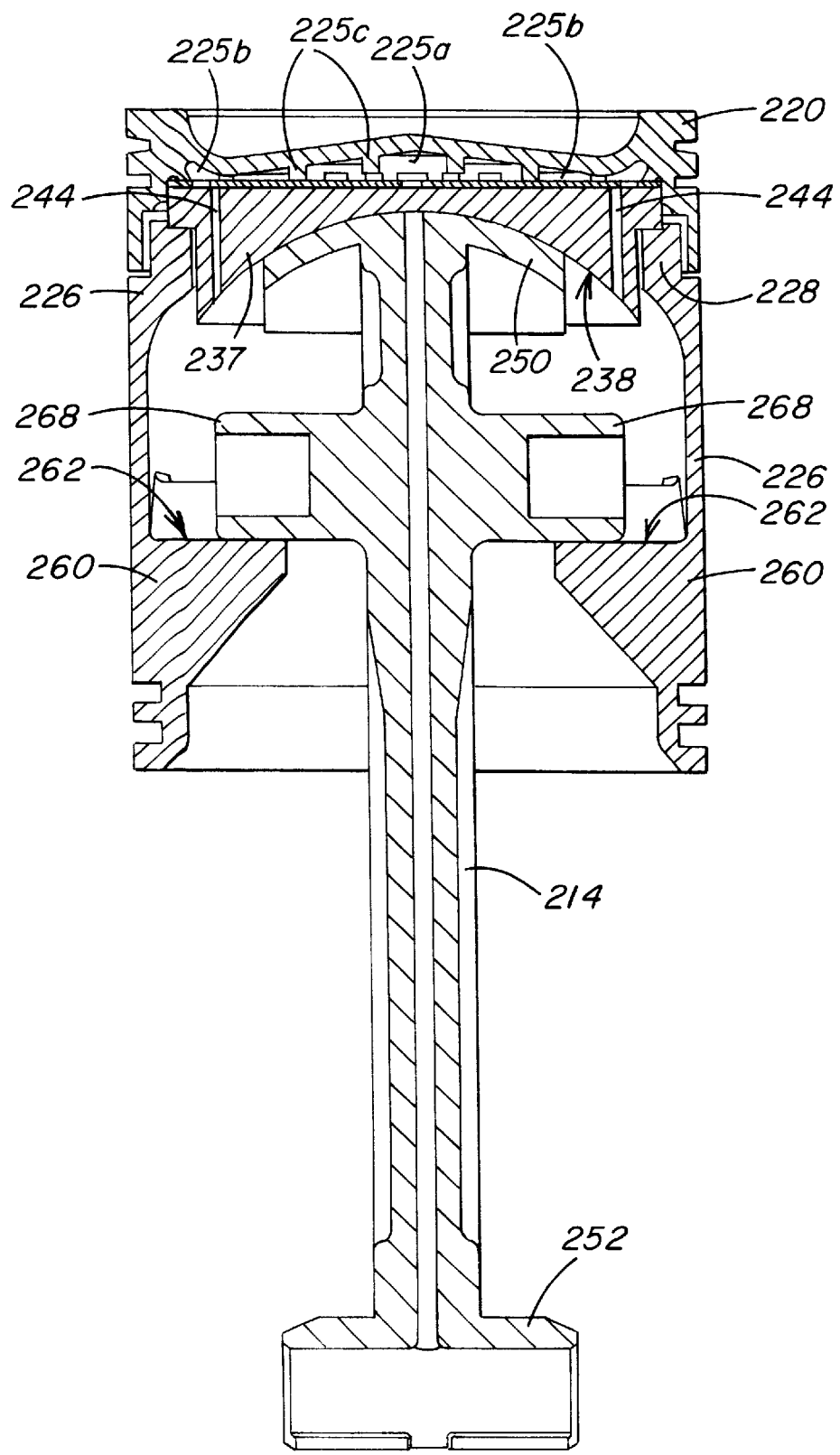
Figure 25:
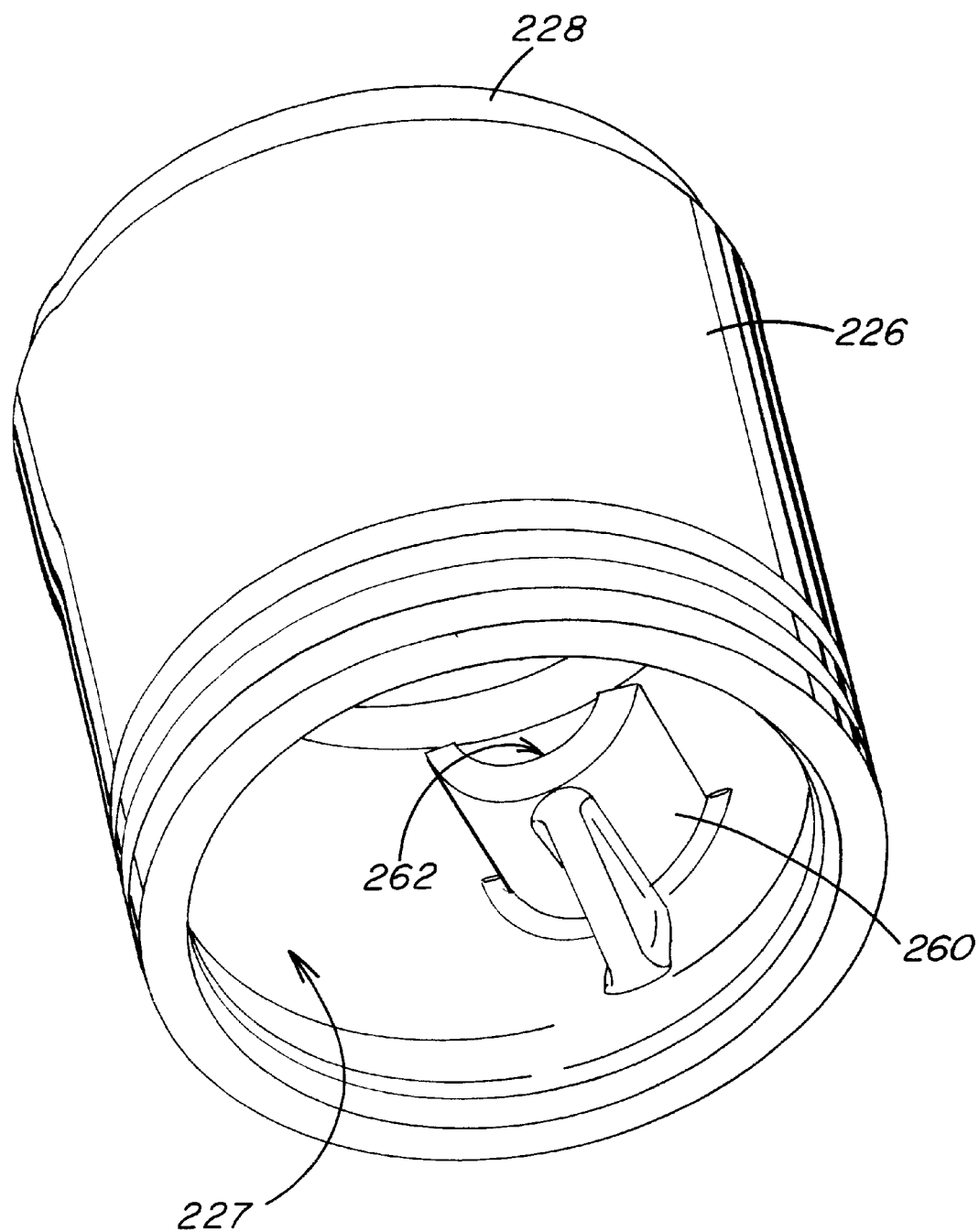
FIG. 25 is an isometric view of the piston skirt of the piston and connecting rod assembly depicted in FIGS. 22–24, and showing a portion of the top-of-stroke inertia reaction retainer integral with an inner surface of the piston skirt.
Figure 26:
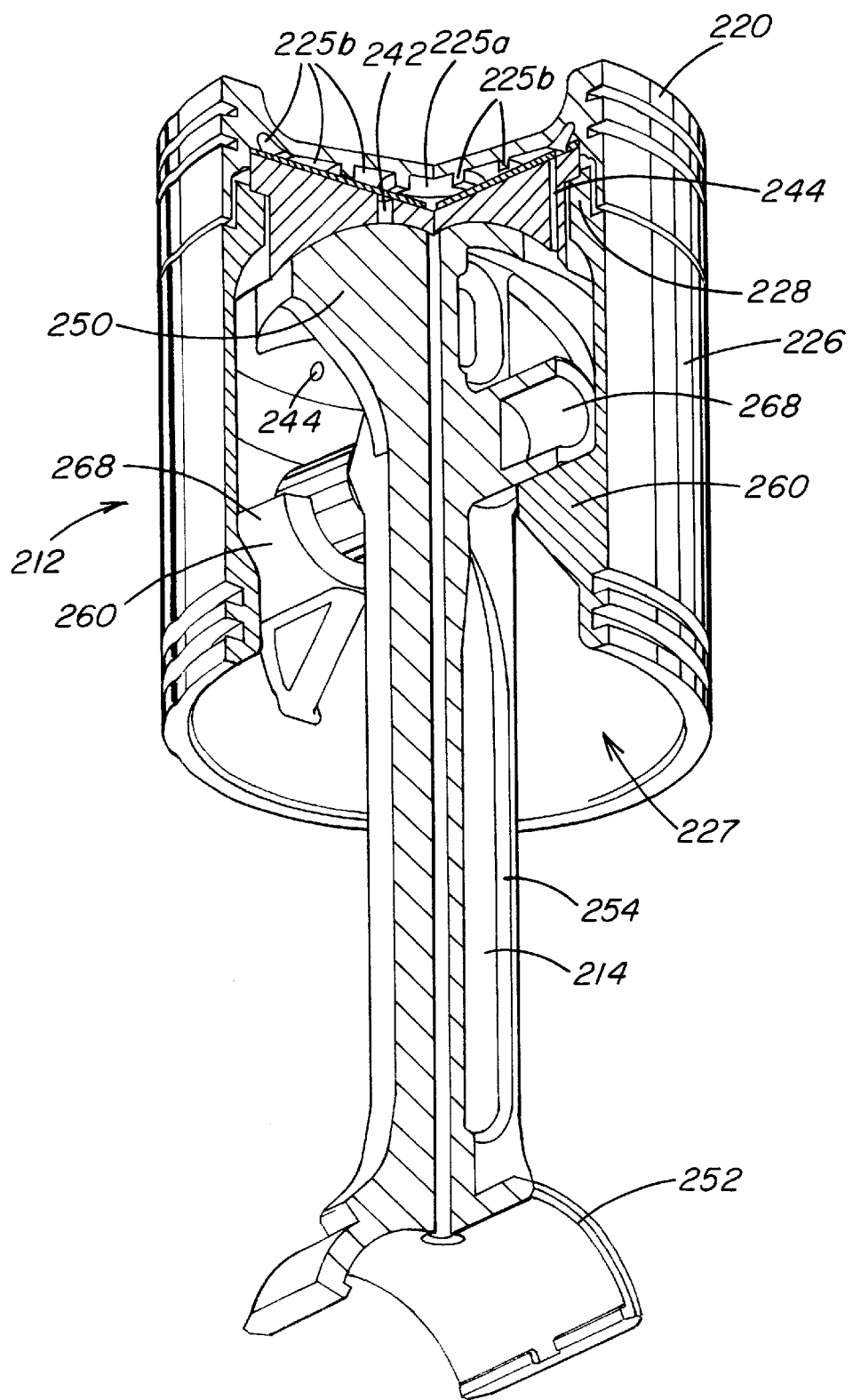
FIG. 26 is a partial cut-away isometric view of the piston and connecting rod assembly depicted in FIGS. 22–24, and showing a portion of the piston skirt and other elements of the assembly cut away to reveal the interface between the connecting rod and the top-of-stroke reaction retainer elements of the piston skirt.

Assembly 210 further includes a bearing insert 234 having a disk-shaped mounting portion 236 from which projects a bearing portion 237 having a bearing surface 238. The bearing portion 237 has a cylindrical perimeter that is sized to fit within the void 227 so that a surface 239 of the mounting portion 236 contacts the rim 228 of the piston skirt 226, and the mounting portion 234 is captured intermediate the piston crown 220 and piston skirt 226 when those elements are connected together. The bearing surface 238 is a concave region shaped as a region of sphere and, therefore, is defined by a spherical radius of curvature. The bearing insert 234 also includes therethrough two generally centrally located bores 242, and further includes two bores 244 that are located nearer the perimeter of the bearing insert 234. As shown in FIGS. 23, 24, and 26, the bores 242 and 244 each open onto the curved bearing surface 238 of the bearing portion 237.

Connecting rod 214 of assembly 210 is substantially identical in construction to the connecting rod 22 of assembly 10 in that connecting rod 210 includes a first end 250, a second end 252 of the "slipper" type, and an elongated intermediate portion 254. First end 250 includes a bearing surface 258 that is a curved convex surface defined by a spherical radius of curvature having a region that will contact and articulate with a region of the concave bearing surface 238 of the bearing insert 237. Similar to assembly 10, the articulation that may occur as between the bearing surfaces 238 and 258 provides a joint allowing relative movement between the connecting rod 214 and the bearing insert 237, and ultimately between the connecting rod 214 and the piston 212.

In order to retain the connecting rod 214 and the piston 212 together as a unit, the interior surface of the piston skirt 226 includes two opposed mounting structures 260, each having a curved portion defining a concave pivot surface 262. The connecting rod 214 includes two projecting cylindrical structures defining pivot projections 268 having central axis generally transverse to the longitudinal axis of the connecting rod's longitudinal axis. Based on the description of assembly 10 above, it will be understood that each pivot projection 268 is nested against a pivot surface 262 to thereby retain the bearing surfaces 258 and 238 in contact while allowing for relative movement between the connecting rod 214 and piston 212.

Piston 212 of assembly 210 also may include a separator 272 between the inner surface 222 of the piston crown and the bearing insert 234. The separator may be in the form of a circular plate and includes several bores 274 therethrough for passage of engine oil. The separator 272 may be constructed and provides the functions as described in connection with separator 50 of assembly 10. In particular, the separator 272 may be constructed to appropriately direct engine oil exiting under pressure through bores 242 in bearing insert 237 to the recess 225a and channels 225b formed on the inner surface of the piston crown 220. Engine oil is channeled away from the piston crown through bores 274 in the separator 272 and into bores 244 through the bearing insert 238, from which the engine oil may pass to the oil sump.

Thus, rather than including the retainer as a separate component, assembly 210 incorporates elements of the retainer 90 of the assembly 10 into the piston skirt 226, which provides several advantages. Initially, there is a reduction in the number of parts, and the reduced parts number allows for ease of assembly and reduces the required parts inventories. The construction of assembly 210 also may provide a reduction in weight relative to assembly 10, which is an important consideration in a reciprocating engine. In addition, assembly 210 incorporates a spherically-shaped bearing surfaces 238 and 258, allowing for the bearing surfaces to be manufactured in a non-location specific manner and without the need for locating the bearing surfaces rotationally. This reduces manufacturing cost and also reduces the sensitivity to machining tolerances for location of the bearing.

Although distinct embodiments of the present invention have been discussed above, it will be apparent that certain features of those embodiments may be variously combined to provide additional embodiments within the broader scope of the invention. For example, a piston and connecting rod assembly within the scope of the present invention may be provided with articulating connecting rod and bearing insert surfaces defined by a cylindrical radius of curvature (as in assembly 10) and having a retainer integral with an inner surface of the piston skirt (as in assembly 210). As an additional example, a piston and connecting rod assembly of the present invention may include articulating connecting rod and bearing insert surfaces defined by a spherical radius of curvature (as in assembly 210) and a retainer that is a component separate from the piston skirt, piston crown, and bearing insert.

Advantages of the piston and connecting rod assembly of the present invention include the fact that a much larger piston to connecting rod bearing area may be attained compared with conventional designs including a piston pin. Another advantage is that the cooling channels may be naturally formed in the piston crown by the interface of the bearing insert (or separator plate) with the inner surface of the piston crown, thereby eliminating the need for cast-in cooling channels in the piston crown or complex machining arrangements. Because the piston skirt does not carry conventional pin bosses, it is less susceptible to the asymmetric thermal expansion that may be experienced with such conventional designs. In conventional designs, asymmetric thermal loading results from the disparity in mass between the piston pin axis and the thrust plane. The thermal symmetry that may be achieved by the design of the present invention also is enhanced by the symmetric connection that may be provided between the piston crown and piston skirt. In addition, the large bearing area that may be provided in the present invention between the piston and connecting rod (as is provided, for example, between the articulating regions of bearing surfaces 62 and 76 in assembly 10, and by bearing surfaces 238 and 258 of assembly 210) also reduces the possibility of distortions due to gas pressure loading.

An additional advantage of the piston and connecting rod assembly of the present invention is that the effective connecting rod length may be readily changed without affecting the physical length of the connecting rod or the piston. The change in effective length may be accomplished by changing the radius of curvature of the bearing surface (whether concave or convex) of the first end of the connecting rod without changing the crankpin centerline to the top of a convex radius or the bottom of a concave radius. The ability to adjust the effective connecting rod length may be used to optimize engine valve and port opening times. Long connecting rod lengths obtained with connecting rod first ends having concave contours with large radii of curvature would be particularly useful in four stroke engines, while short connecting rod lengths obtained by providing convex connecting rod first ends having large radii of curvature would be particularly useful in two stroke engines. An additional advantage of the piston and connecting rod assembly of the present invention is that it may be advantageously used in, for example, prototype or low production volume engines because the component parts may be readily machined from bar materials, eliminating the need for casting tools and forging.

The various elements of the present invention may be constructed of materials as appropriate to the particular application. Typically, the various components of the invention will be cast or machined from durable materials such iron, steel, aluminum, or other metals or alloys.

Although the foregoing description has necessarily presented a limited number of embodiments of the invention having specific constructions, those of ordinary skill in the art will appreciate that various changes in the configurations, details, materials, and arrangement of the elements that have been herein described and illustrated in order to explain the nature of the invention may be made by those skilled in the art, and all such modifications will remain within the principle and scope of the invention as expressed herein in the appended claims.

We claim:

1. A piston and connecting rod assembly comprising:
   a piston crown;
   a piston skirt being a component separate from said piston crown, said piston skirt connected to said piston crown to provide a piston body;
   a connecting rod having a first end and a second end, said first end having a first bearing surface; and
   a bearing insert being a component separate from said piston crown and said piston skirt, at least a portion of said bearing insert disposed intermediate a surface of said piston crown and a surface of said piston skirt, said bearing insert fixedly disposed within said piston body and being contacted by said first bearing surface so as to transmit substantially all load from said connecting rod to said piston body while permitting said first bearing surface to articulate relative to said bearing insert.

2. The piston and connecting rod assembly of claim 1 wherein said piston crown includes an inner surface and said bearing insert is intermediate said inner surface of said piston crown and said first bearing surface.

3. The piston and connecting rod assembly of claim 1, wherein said bearing insert includes a second bearing surface, said first bearing surface contacting said second bearing surface.

4. The piston and connecting rod assembly of claim 3, wherein at least a region of said first bearing surface at least partially conforms to and articulates with at least a region of said second bearing surface.

5. The piston and connecting rod assembly of claim 4, wherein one of said first bearing surface and said second bearing surface is a concave surface and the other of said first bearing surface and said second bearing surface is a convex surface, at least a region of said concave surface conforming to and articulating with said convex surface.

6. The piston and connecting rod assembly of claim 5, wherein both said first bearing surface and said second bearing surface are curved surfaces defined by a radius of curvature selected from a cylindrical radius of curvature and a spherical radius of curvature.

7. The piston and connecting rod assembly of claim 5 wherein said convex surface is shaped as a region of a surface of a generally barrel-shaped structure.

8. The piston and connecting rod assembly of claim 5, wherein said bearing insert comprises:
   a bearing portion including said second bearing surface; and
   a mounting portion, said bearing portion projecting from said mounting portion, said mounting portion fixedly mounted within said piston body to thereby fixedly mount said second bearing surface within said piston body.

9. The piston and connecting rod assembly of claim 8, wherein said mounting portion has a circular perimeter region that is captured intermediate said piston crown and said piston skirt to fixedly mount said mounting portion within said piston body.

10. The piston and connecting rod assembly of claim 8, wherein:
    said connecting rod includes a first passageway between its said second end and said first bearing surface; and
    said bearing insert includes a first surface opposing said inner surface of said piston crown, and further includes a second passageway between its said first surface and said second bearing surface, said first and second passageways providing a fluid pathway between said second end of said connecting rod and said inner surface of said piston crown.

11. The piston and connecting rod assembly of claim 10, wherein said first coolant passageway provides a fluid to said first bearing surface and said second bearing surface.

12. The piston and connecting rod assembly of claim 10, wherein at least one of said first surface of said bearing insert and said inner surface of said piston crown includes at least one coolant channel in communication with said second passageway of said bearing insert.

13. The piston and connecting rod assembly of claim 12, wherein said second passageway includes a recess in said second bearing surface, said first passageway of said connecting rod opening into said recess in said second bearing surface.

14. The piston and connecting rod assembly of claim 13, wherein said mounting portion of said bearing insert includes at least one return hole therethrough for conducting fluid away from said inner surface of said piston crown.

15. The piston and connecting rod assembly of claim 14, further comprising:
    a separator fixedly disposed within said piston body intermediate said inner surface of said piston crown and said first surface of said bearing insert, said separator including a plurality of holes therethrough.

16. The piston and connecting rod assembly of claim 15, wherein said piston crown threadedly connects to said piston skirt and thereby captures said separator and said bearing insert within said piston body.

17. The piston and connecting rod assembly of claim 16, wherein the combination of said first passageway, said recess in said second bearing surface, said second passageway, said at least one coolant channel, said plurality of holes in said separator, and said at least one hole through said bearing insert communicate to provide a liquid circulation pathway from said second end of said connecting rod to said inner surface of said piston crown and away from said inner surface of said piston crown.

18. The piston and connecting rod assembly of claim 17 wherein said piston crown includes at least one piston ring groove and said separator plate directs coolant toward a region of said inner surface of said piston crown adjacent said piston ring grooves.

19. A piston and connecting rod assembly comprising:
a piston crown having an inner surface;
a piston skirt being a separate component from said piston crown, said piston skirt connected to said piston crown to provide a piston body;
a connecting rod having a first end and a second end, said first end having a first bearing surface;
a separator being a separate component from said piston crown and said piston skirt and being fixedly disposed within said piston body; and
a bearing insert being a component separate from said piston crown, said piston skirt, and said separator and being fixedly disposed within said piston body, said bearing insert being contacted by said first bearing surface so as to transmit substantially all load from said connecting rod to said piston body while permitting said first bearing surface to articulate relative to said bearing insert at least a portion of said bearing insert disposed intermediate a surface of said piston crown and a surface of said piston skirt, said bearing insert being contacted by said separator plate intermediate said inner surface of said piston crown and said bearing insert.

20. The piston and connecting rod assembly of claim 19, wherein said separator is a plate of a material having lower thermal conductivity than said piston crown.

21. The piston and connecting rod assembly of claim 20, wherein said plate consists of a material selected from titanium, ceramic, and low thermal conductivity composite material.

22. A piston and connecting rod assembly comprising:
a piston crown having an inner surface;
a piston skirt being a component separate from said piston crown, said piston skirt connected to said piston crown to provide a piston body;
a connecting rod having a first end and a second end, said first end having a first bearing surface;
a bearing insert being a component separate from said piston crown and said piston skirt and being fixedly disposed within said piston body, said bearing insert being contacted by said first bearing surface so as to transmit substantially all load from said connecting rod to said piston body while permitting said first bearing surface to articulate relative to said bearing insert; and
a retainer securing said connecting rod to said piston body with said first bearing surface contacting and articulating with said bearing insert.

23. The piston and connecting rod assembly of claim 22, wherein:
said bearing insert includes a second bearing surface; and
said first bearing surface contacts and articulates with said second bearing surface.

24. The piston and connecting rod assembly of claim 23, wherein said retainer is a component separate from said piston crown and said piston body and is fixedly mounted within said piston body.

25. The piston and connecting rod assembly of claim 24, wherein:
said connecting rod includes two pivot elements; and
said retainer includes two bearing element, each said bearing element including a pivot surface, each said pivot element contacting and articulating with a said pivot surface.

26. The piston and connecting rod assembly of claim 25, wherein said retainer includes a mounting portion having first and second surfaces, said mounting portion of said retainer fixedly secured within said piston body, said bearing elements extending from said first surface of said mounting portion.

27. The piston and connecting rod assembly of claim 26, wherein said mounting portion of said retainer has a circular perimeter and is captured between said piston body and said bearing insert, said bearing elements extending from said mounting portion toward said second end of said connecting rod.

28. The piston and connecting rod assembly of claim 27, wherein:
each said bearing element is an arched member having an inner surface and extending from said first surface of said mounting portion of said retainer toward said second end of said connecting rod, said inner surface of each said bearing element including a concave surface defining a said pivot surface; and
each said pivot element includes a convex surface articulating with a said concave surface of a said arched member.

29. The piston and connecting rod assembly of claim 28, wherein each said pivot element is a cylindrical projection having a central axis generally transverse to a longitudinal axis of said connecting rod.

30. The piston and connecting rod assembly of claim 29, wherein said bearing insert comprises:
a mounting portion having first and second surfaces and a circular perimeter region, said mounting portion being fixedly mounted within said piston body; and
a bearing portion projecting from said second surface of said mounting portion and including said second bearing surface.

31. The piston and connecting rod assembly of claim 30, wherein:
said mounting portion of said retainer includes a void therethrough; and
said bearing portion of said bearing insert is disposed through said void in said mounting portion of said retainer, said second surface of said mounting portion of said bearing insert contacting said first surface of said mounting portion of said retainer.

32. The piston and connecting rod assembly of claim 31, wherein said retainer further includes at least one passageway between said first and second surfaces of said mounting portion of said retainer.

33. The piston and connecting rod assembly of claim 32, wherein said retainer comprises two bearing structures projecting from said piston skirt within said piston body.

34. The piston and connecting rod assembly of claim 33, wherein:
said connecting rod includes two pivot elements extending therefrom; and
each said bearing structure includes a pivot surface, each said pivot element contacting and articulating with a said pivot surface.

35. The piston and connecting rod assembly of claim 34, wherein:
each said bearing structure includes a concave surface defining a said pivot surface of said bearing structure; and
each said pivot element includes a convex surface articulating with a said concave surface of a said bearing structure.

36. The piston and connecting rod assembly of claim 35, wherein each said pivot element is a cylindrical projection having a central axis generally transverse to a longitudinal axis of said connecting rod.

37. The piston and connecting rod assembly of claim 36, wherein said bearing insert comprises:
a mounting portion having first and second surfaces and a circular perimeter region, said mounting portion being fixedly mounted within said piston body; and
a bearing portion projecting from said second surface of said mounting portion and including said second bearing surface.

38. The piston and connecting rod assembly of claim 37, wherein said second surface of said mounting portion of said bearing insert contacts said piston skirt and is captured within said piston body by connection of said piston skirt and said piston crown.

39. The piston and connecting rod assembly of claim 38, wherein:
said bearing portion includes a cylindrical perimeter surface and said second bearing surface is a concave surface defined by a spherical radius of curvature; and
said first bearing surface of said connecting rod is a convex surface defined by a spherical radius of curvature generally identical to said spherical radius of curvature defining said second bearing surface.

40. The piston and connecting rod assembly of claim 22, wherein said piston crown threadedly connects to said piston skirt and captures a portion of said bearing insert therebetween.

41. The piston and connecting rod assembly of claim 40, wherein:
said piston crown includes a threaded inner perimeter region; and
said piston skirt includes a threaded outer perimeter region, said threaded inner perimeter region threadedly engaging said threaded outer perimeter region and capturing said portion of said bearing insert between said piston crown and said piston skirt.

42. The piston and connecting rod assembly of claim 23, wherein said piston crown threadedly connects to said piston skirt and captures a portion of said bearing insert and a portion of said retainer therebetween.

43. The piston and connecting rod assembly of claim 42, wherein:
said piston crown includes a threaded inner perimeter region; and
said piston skirt includes a threaded outer perimeter region, said threaded outer perimeter region threadedly engaging said threaded inner perimeter region and capturing said portion of said bearing insert and said portion of said retainer between said piston crown and said piston skirt.

44. A piston and connecting rod assembly comprising:
a piston crown having an inner surface;
a piston skirt being a component separate from said piston crown, said piston skirt connected to said piston crown to provide a piston body;
a connecting rod including a first end and a second end, said first end having a first bearing surface;
a bearing insert being a component separate from said piston crown and said piston skirt, at least a portion of said bearing insert disposed intermediate a surface of said piston crown and a surface of said piston skirt, said bearing insert disposed within said piston body intermediate said inner surface of said piston crown and said first bearing surface, and said bearing insert being contacted by said first bearing surface so as to transmit substantially all load from said connecting rod to said piston body while permitting said first bearing surface to articulate relative to said bearing insert;
a separator being a component separate from said piston crown, said piston skirt and said bearing insert, said separator disposed within said piston body intermediate said inner surface of said piston crown and said bearing insert; and
a retainer securing said connecting rod to said piston body with said first bearing surface contacting and articulating with said bearing insert.

45. The piston and connecting rod assembly of claim 44, wherein said bearing insert includes a second bearing surface, said first bearing surface of said connecting rod contacting said second bearing surface.

46. The piston and connecting rod assembly of claim 45, wherein at least a region of said first bearing surface at least partially conforms to and articulates with at least a region of said second bearing surface.

47. The piston and connecting rod assembly of claim 46, wherein:
said piston crown includes one of a threaded outer perimeter region and a threaded inner perimeter region; and
said piston skirt includes the other of said threaded outer perimeter region and said threaded inner perimeter region, said threaded outer perimeter region threadedly engaging said threaded inner perimeter region and capturing a portion of said separator and a portion of said bearing insert intermediate said piston skirt and said piston crown, said separator contacting said bearing insert.

48. The piston and connecting rod assembly of claim 44, wherein said separator is a plate of a material having a lower thermal conductivity than said piston crown.

49. The piston and connecting rod assembly of claim 48, wherein said plate consists of titanium, ceramic, and low thermal conductivity composite material.

50. The piston and connecting rod assembly of claim 44, wherein said retainer is a component separate from said piston crown, said piston skirt, said separator, and said bearing insert.

51. The piston and connecting rod assembly of claim 47, wherein a portion of said retainer also is captured intermediate said piston crown and said piston skirt by said threaded engagement of said threaded inner perimeter region and said threaded outer perimeter region.

52. The piston and connecting rod assembly of claim 50, wherein:
said connecting rod includes two pivot elements; and
said retainer includes two bearing elements, each said bearing element including a pivot surface, each said pivot element contacting and articulating with a said pivot surface.

53. The piston and connecting rod assembly of claim 44, wherein said retainer comprises two bearing elements projecting from said piston skirt within said piston body.

54. The piston and connecting rod assembly of claim 53, wherein:

said connecting rod includes two pivot elements extending therefrom; and each said bearing element includes a pivot surface, each said pivot element contacting and articulating with a said pivot surface.

55. The piston and connecting rod assembly of claim 45, further comprising a fluid circulation pathway between said second end of said connecting rod and said inner surface of said piston crown for providing a fluid to said inner surface of said piston crown.

56. The piston and connecting rod assembly of claim 55, wherein said pathway comprises:

a first passageway in said connecting rod between said second end and said first bearing surface;

a second passageway through said bearing insert opening on said second bearing surface; and at least one hole defined through said separator.

57. The piston and connecting rod assembly of claim 56, wherein said pathway further comprises holes through at least said separator and said bearing insert for conducting a fluid away from said inner surface of said piston crown.

58. The piston and connecting rod assembly of claim 57, wherein:

said inner surface of said piston crown includes at least one channel thereon; and said separator contacts said inner surface and encloses at least a portion of said at least one channel, said enclosed portion conducting a fluid along said inner surface.

59. The piston and connecting rod assembly of claim 58, wherein:

a perimeter portion of said piston crown includes at least one piston ring groove; and said separator is configured to conduct a fluid to the vicinity of said perimeter portion.

60. A piston and connecting rod assembly comprising:

a piston crown having an inner surface;

a piston skirt being a component separate from said piston crown, said piston skirt connected to said piston crown to provide a piston body, a connecting rod having a first end;

means for articulating with said first end, said means for articulating being a separate element from said piston crown and said piston skirt and being disposed within said piston body, at least a portion of said means for articulating disposed intermediate a surface of said piston crown and a surface of said piston skirt, said means for articulating to transmit substantially all load from said connecting rod to said piston body and allow movement of said connecting rod relative to said piston body.

61. The piston and connecting rod assembly of claim 60, further comprising:

means for securing said connecting rod to said piston body so that said first end of said connecting rod contacts and articulates with said means for articulating.

62. The piston and connecting rod assembly of claim 61, further comprising:

means for separating said bearing insert from said inner surface, said means for separating being a component separate from said piston crown, said piston skirt, and said means for articulating, and being disposed within said piston body.

63. An apparatus comprising:

a piston comprising a piston crown having an inner surface, a piston skirt being a component separate from said piston crown, said piston skirt connected to said piston crown to provide a piston body, and a bearing insert being a component separate from said piston crown and said piston skirt, at least a portion of said bearing insert disposed intermediate a surface of said piston crown and a surface of said piston skirt, said bearing insert fixedly disposed within said piston body; and a connecting rod having a first end, said first end contacting, transmitting substantially all load to and articulating with said bearing insert.

64. The apparatus of claim 63, wherein said multipart piston further comprises:

a retainer within said piston body, said retainer securing said connecting rod to said piston body.

65. The apparatus of claim 64, wherein said multipart piston further comprises:

a separator being a separate component from said piston crown, said piston skirt, said bearing insert, and said retainer, said separator disposed within said piston body intermediate said bearing insert and said inner surface of said piston crown.

66. The apparatus of claim 63, wherein the apparatus is selected from an internal combustion engine, a compressor, or a slider crank mechanism.

67. A piston and connecting rod assembly comprising:

a piston crown;

a piston skirt being a component separate from said piston crown, said piston skirt connected to said piston crown to provide a piston body;

a connecting rod having a first end and a second end, said first end having a first bearing surface; and a bearing insert being a component separate from said piston crown and said piston skirt, said bearing insert contacting at least one of said piston crown and said piston skirt, said bearing insert fixedly disposed within said piston body and being contacted by said first bearing surface so as to transmit substantially all load from said connecting rod to said piston body while permitting said first bearing surface to articulate relative to said bearing insert.

68. A piston and connecting rod assembly comprising:

a piston crown having an inner surface;

a piston skirt being a separate component from said piston crown, said piston skirt connected to said piston crown to provide a piston body;

a connecting rod having a first end and a second end, said first end having a first bearing surface;

a separator being a separate component from said piston crown and said piston skirt and being fixedly disposed within said piston body; and a bearing insert being a component separate from said piston crown, said piston skirt, and said separator plate and being fixedly disposed within said piston body, said bearing insert being contacted by said first bearing surface so as to transmit substantially all load from said connecting rod to said piston body while permitting said first bearing surface to articulate relative to said bearing insert, said bearing insert contacting at least one of said piston crown and said piston skirt, said bearing insert being contacted by said separator plate intermediate said inner surface of said piston crown and said bearing insert.

69. A piston and connecting rod assembly comprising:

a piston crown having an inner surface;

a piston skirt being a component separate from said piston crown, said piston skirt connected to said piston crown to provide a piston body;

a connecting rod having a first end;

means for articulating with said first end, said means for articulating being a separate element from said piston crown and said piston skirt and being disposed within said piston body, said means for articulating contacting at least one of said piston crown and said piston skirt, said means for articulating to transmit substantially all load from said connecting rod to said piston body and allow movement of said connecting rod relative to said piston body.

70. An apparatus comprising:

a piston comprising
  a piston crown having an inner surface,
  a piston skirt being a component separate from said piston crown, said piston skirt connected to said piston crown to provide a piston body, and
  a bearing insert being a component separate from said piston crown and said piston skirt, said bearing insert contacting at least one of said piston crown and said piston skirt, said bearing insert fixedly disposed within said piston body; and a connecting rod having a first end, said first end contacting, transmitting substantially all load to and articulating with said bearing insert.

71. A piston and connecting rod assembly comprising:

a piston crown having an inner surface;

a piston skirt being a separate component from said piston crown, said piston skirt connected to said piston crown to provide a piston body;

a connecting rod having a first end and a second end, said first end having a first bearing surface;

a separator of a material having lower thermal conductivity than said piston crown, said separator being a separate component from said piston crown and said piston skirt and being fixedly disposed within said piston body; and a bearing insert being a component separate from said piston crown, said piston skirt, and said separator and being fixedly disposed within said piston body, said bearing insert being contacted by said separator intermediate said inner surface of said piston crown and said bearing insert.

72. The piston and connecting rod assembly of claim 71, wherein said separator plate consists of a material selected from titanium, ceramic, and low thermal conductivity composite material.

73. A piston and connecting rod assembly comprising:

a piston crown having an inner surface;

a piston skirt being a component separate from said piston crown, said piston skirt connected to said piston crown to provide a piston body;

a connecting rod including two pivot elements, a first end, and a second end, said first end having a first bearing surface;

a bearing insert being a component separate from said piston crown and said piston skirt;

said bearing insert disposed within said piston body intermediate said inner surface of said piston crown and said first bearing surface;

a separator being a component separate from said piston crown, said piston skirt and said bearing insert, said separator disposed within said piston body intermediate said inner surface of said piston crown and said bearing insert; and a retainer securing said connecting rod to said piston body with said first bearing surface contacting and articulating with said bearing insert, said retainer being a component separate from said piston crown, said piston skirt, said separator, and said bearing insert, said retainer including two bearing elements, each of said two bearing elements including a pivot surface, each of said two pivot elements of said connecting rod contacting and articulating with a said pivot surface.

74. A piston and connecting rod assembly comprising:

a piston crown having an inner surface;

a piston skirt being a component separate from said piston crown, said piston skirt connected to said piston crown to provide a piston body;

a connecting rod including a first end and a second end, said first end having a first bearing surface;

a bearing insert being a component separate from said piston crown and said piston skirt; said bearing insert disposed within said piston body intermediate said inner surface of said piston crown and said first bearing surface;

a separator being a component separate from said piston crown, said piston skirt and said bearing insert, said separator disposed within said piston body intermediate said inner surface of said piston crown and said bearing insert; and a retainer securing said connecting rod to said piston body with said first bearing surface contacting and articulating with said bearing insert, said retainer comprising two bearing elements projecting from said piston skirt within said piston body.

75. A piston and connecting rod assembly comprising:

a piston crown having an inner surface;

a piston skirt being a component separate from said piston crown, said piston skirt connected to said piston crown to provide a piston body;

a connecting rod having a first end and a second end, said first end having a first bearing surface, said connecting rod including two pivot elements;

a bearing insert being a component separate from said piston crown and said piston skirt and being fixedly disposed within said piston body, said bearing insert including a second bearing surface, said first bearing surface contacting and articulating with said second bearing surface; and a retainer securing said connecting rod to said piston body with said first bearing surface contacting and articulating with said bearing insert, said retainer being a component separate from said piston crown and said piston body and being fixedly mounted within said piston body, said retainer including two bearing elements, each said bearing element including a pivot surface, each said pivot element contacting and articulating with a said pivot surface.

76. The piston and connecting rod assembly of claim 75, wherein said retainer includes a mounting portion having first and second surfaces, said mounting portion of said retainer fixedly secured within said piston body, said bearing elements extending from said first surface of said mounting portion.

77. The piston and connecting rod assembly of claim 76, wherein said mounting portion of said retainer has a circular perimeter and is captured between said piston body and said bearing insert, said bearing elements extending from said mounting portion toward said second end of said connecting rod.

78. The piston and connecting rod assembly of claim 77, wherein:
   each said bearing element is an arched member having an inner surface and extending from said first surface of said mounting portion of said retainer toward said second end of said connecting rod, said inner surface of each said bearing element including a concave surface defining a said pivot surface; and
   each said pivot element includes a convex surface articulating with a said concave surface of a said arched member.

79. The piston and connecting rod assembly of claim 78, wherein each said pivot element is a cylindrical projection having a central axis generally transverse to a longitudinal axis of said connecting rod.

80. The piston and connecting rod assembly of claim 79, wherein said bearing insert comprises:
   a mounting portion having first and second surfaces and a circular perimeter region, said mounting portion being fixedly mounted within said piston body; and
   a bearing portion projecting from said second surface of said mounting portion and including said second bearing surface.

81. The piston and connecting rod assembly of claim 80, wherein:
   said mounting portion of said retainer includes a void therethrough; and
   said bearing portion of said bearing insert is disposed through said void in said mounting portion of said retainer, said second surface of said mounting portion of said bearing insert contacting said first surface of said mounting portion of said retainer.

82. The piston and connecting rod assembly of claim 81, wherein said retainer further includes at least one passageway between said first and second surfaces of said mounting portion of said retainer.

83. The piston and connecting rod assembly of claim 82, wherein said retainer comprises two bearing structures projecting from said piston skirt within said piston body.

84. The piston and connecting rod assembly of claim 83, wherein:
   said connecting rod includes two pivot elements extending therefrom; and
   each said bearing structure includes a pivot surface, each said pivot element contacting and articulating with a said pivot surface.

85. The piston and connecting rod assembly of claim 84, wherein:
   each said bearing structure includes a concave surface defining a said pivot surface of said bearing structure; and
   each said pivot element includes a convex surface articulating with a said concave surface of a said bearing structure.

86. The piston and connecting rod assembly of claim 85, wherein each said pivot element is a cylindrical projection having a central axis generally transverse to a longitudinal axis of said connecting rod.

87. The piston and connecting rod assembly of claim 86, wherein said bearing insert comprises:
   a mounting portion having first and second surfaces and a circular perimeter region, said mounting portion being fixedly mounted within said piston body; and
   a bearing portion projecting from said second surface of said mounting portion and including said second bearing surface.

88. The piston and connecting rod assembly of claim 87, wherein said second surface of said mounting portion of said bearing insert contacts said piston skirt and is captured within said piston body by connection of said piston skirt and said piston crown.

89. The piston and connecting rod assembly of claim 88, wherein:
   said bearing portion includes a cylindrical perimeter surface and said second bearing surface is a concave surface defined by a spherical radius of curvature; and
   said first bearing surface of said connecting rod is a convex surface defined by a spherical radius of curvature generally identical to said spherical radius of curvature defining said second bearing surface.

90. A piston and connecting rod assembly comprising:
   a piston crown having an inner surface;
   a piston skirt being a component separate from said piston crown, said piston skirt connected to said piston crown to provide a piston body;
   a connecting rod including a first end and a second end, said first end having a first bearing surface;
   a bearing insert being a component separate from said piston crown and said piston skirt, at least a portion of said bearing insert disposed intermediate a surface of said piston crown and a surface of said piston skirt, said bearing insert disposed within said piston body intermediate said inner surface of said piston crown and said first bearing surface;
   a separator being a component separate from said piston crown, said piston skirt and said bearing insert, said separator disposed within said piston body intermediate said inner surface of said piston crown and said bearing insert, said separator being a plate of a material having a lower thermal conductivity than said piston crown; and
   a retainer securing said connecting rod to said piston body with said first bearing surface contacting and articulating with said bearing insert.

91. The piston and connecting rod assembly of claim 90, wherein said plate consists of titanium, ceramic, and low thermal conductivity composite material.

92. A piston and connecting rod assembly comprising:
   a piston crown having an inner surface;
   a piston skirt being a component separate from said piston crown, said piston skirt connected to said piston crown to provide a piston body;

a connecting rod including a first end and a second end, said first end having a first bearing surface, said connecting rod including two pivot elements extending therefrom;

a bearing insert being a component separate from said piston crown and said piston skirt, at least a portion of said bearing insert disposed intermediate a surface of said piston crown and a surface of said piston skirt, said bearing insert disposed within said piston body intermediate said inner surface of said piston crown and said first bearing surface;

a separator being a component separate from said piston crown, said piston skirt and said bearing insert, said separator disposed within said piston body intermediate said inner surface of said piston crown and said bearing insert; and a retainer securing said connecting rod to said piston body with said first bearing surface contacting and articulating with said bearing insert, said retainer comprising two bearing elements projecting from said piston skirt within said piston body, each said bearing element including a pivot surface, each said pivot element contacting and articulating with a said pivot surface.

93. An apparatus comprising:

a piston comprising a piston crown having an inner surface, a piston skirt being a component separate from said piston crown, said piston skirt connected to said piston crown to provide a piston body;

a bearing insert being a component separate from said piston crown and said piston skirt, at least a portion of said bearing insert disposed intermediate a surface of said piston crown and a surface of said piston skirt, said bearing insert fixedly disposed within said piston body;

a connecting rod having a first end, said first end contacting and articulating with said bearing insert;

a retainer within said piston body, said retainer securing said connecting rod to said piston body; and a separator being a separate component from said piston crown, said piston skirt, said bearing insert, and said retainer, said separator disposed within said piston body intermediate said bearing insert and said inner surface of said piston crown.

* * * * *

UNITED STATES PATENT AND TRADEMARK OFFICE
CERTIFICATE OF CORRECTION

PATENT NO. : 6,209,510 B1
DATED : April 3, 2001
INVENTOR(S) : Brogdon et al.

It is certified that error appears in the above-identified patent and that said Letters Patent is hereby corrected as shown below:

<u>Column 10,</u>
Line 27, delete "amounting" and substitute therefore -- a mounting --

Signed and Sealed this

Third Day of September, 2002

Attest:

Attesting Officer

JAMES E. ROGAN
*Director of the United States Patent and Trademark Office*